(12) United States Patent
Wang et al.

(10) Patent No.: US 10,712,482 B2
(45) Date of Patent: *Jul. 14, 2020

(54) DISPLAY DEVICE

(71) Applicant: BOE TECHNOLOGY GROUP CO., LTD., Beijing (CN)

(72) Inventors: Wei Wang, Beijing (CN); Yafeng Yang, Beijing (CN); Xiaochuan Chen, Beijing (CN); Qian Wang, Beijing (CN); Jifeng Tan, Beijing (CN); Jian Gao, Beijing (CN); Xinli Ma, Beijing (CN); Can Zhang, Beijing (CN); Can Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 208 days.

This patent is subject to a terminal disclaimer.

(21) Appl. No.: 15/761,131

(22) PCT Filed: Jun. 7, 2017

(86) PCT No.: PCT/CN2017/087435
§ 371 (c)(1),
(2) Date: Mar. 19, 2018

(87) PCT Pub. No.: WO2017/219866
PCT Pub. Date: Dec. 28, 2017

(65) Prior Publication Data
US 2018/0259691 A1     Sep. 13, 2018

(30) Foreign Application Priority Data

Jun. 24, 2016 (CN) .......................... 2016 1 0476224

(51) Int. Cl.
*G02B 5/18* (2006.01)
*G02B 5/20* (2006.01)
*G02F 1/1335* (2006.01)

(52) U.S. Cl.
CPC ......... *G02B 5/1866* (2013.01); *G02B 5/1819* (2013.01); *G02B 5/1842* (2013.01);
(Continued)

(58) Field of Classification Search
CPC . G02F 1/29; G02F 1/133512; G02B 27/2214; G02B 5/1819; G02B 5/1832
(Continued)

(56) References Cited

U.S. PATENT DOCUMENTS 9,213,196 B2 * 12/2015 Yata .................. G02F 1/133504
10,267,961 B2 * 4/2019 Wang ................... G02B 5/1819
(Continued)

FOREIGN PATENT DOCUMENTS

CM    205318031 U    6/2016
CN    101149445 A    3/2008
(Continued)

OTHER PUBLICATIONS

Search Report for International Application No. PCT/CN2017/087435 dated Jul. 28, 2017.
(Continued)

*Primary Examiner* — Audrey Y Chang
(74) *Attorney, Agent, or Firm* — Calfee, Halter & Griswold LLP

(57) ABSTRACT

A display device is disclosed. The display device includes a display panel, and a grating layer arranged inside or outside of the display panel. Along a direction pointing from a center of a sight concentration area of the display device to a non-sight concentration area of the display device, a grating period of the grating layer decreases gradually. When incident light incident on the grating layer is diffracted at an area of the grating layer corresponding to the non-sight concentration area of the display device, the obtained light of non-zero order diffraction falls into a sight of a viewer.

17 Claims, 10 Drawing Sheets

(52) U.S. Cl.
CPC ....... *G02B 5/201* (2013.01); *G02F 1/133504* (2013.01); *G02F 2001/133562* (2013.01); *G02F 2001/133565* (2013.01); *G02F 2201/305* (2013.01)

(58) Field of Classification Search
USPC .................. 359/569, 567; 349/110, 62, 106; 257/291
See application file for complete search history.

(56) References Cited

U.S. PATENT DOCUMENTS

| | | | |
|---|---|---|---|
| 2009/0040426 A1 | 2/2009 | Mather et al. | |
| 2012/0104367 A1* | 5/2012 | Hasegawa | H01L 27/3211 257/40 |
| 2013/0127689 A1 | 5/2013 | Gollier | |
| 2014/0111856 A1 | 4/2014 | Brug et al. | |
| 2014/0184961 A1* | 7/2014 | Zhu | G02F 1/133504 349/110 |
| 2015/0138486 A1* | 5/2015 | Lee | G02F 1/29 349/62 |

FOREIGN PATENT DOCUMENTS

| | | |
|---|---|---|
| CN | 103635850 A | 3/2014 |
| CN | 104254883 A | 12/2014 |
| CN | 105301787 A | 2/2016 |
| CN | 105892079 A | 8/2016 |
| CN | 105911710 A | 8/2016 |
| CN | 105911711 A | 8/2016 |
| CN | 105929587 A | 9/2016 |
| CN | 205722621 U | 11/2016 |
| JP | 20050010341 A | 1/2005 |

OTHER PUBLICATIONS

First Office Action for Chinese Patent Application No. 201610476224.9 dated Nov. 27, 2017.

* cited by examiner 31  32
30

DISPLAY DEVICE

RELATED APPLICATION

This application is the U.S. national phase entry of PCT/CN2017/087435, with an international filing date of Jun. 7, 2017, which claims priority to the Chinese patent application No. 201610476224.9 filed on Jun. 24, 2016, the entirety of both are incorporated herein by reference.

FIELD

The present disclosure relates to the field of display technologies, in particular to a display device.

BACKGROUND

A display device is a device for displaying characters, numbers, symbols, pictures or images formed by at least two selected from a group comprising characters, numbers, symbols and pictures. The display device can be a flat surface display device, a curved-surface display device, a 3D display device, a near eye display device, an enhanced reality (AR)/virtual reality (VR) display device, etc.

At present, the display device typically has a fixed field-of-view concentration area and non-field-of-view concentration area. When a viewer is viewing an image displayed by the display device at a viewing area in front of the display device, the sight of the viewer is concentrated on the field-of-view concentration area. Individual areas of the display device usually have the same light emergent direction, so light rays emitted from the field-of-view concentration area and falling into the sight of the viewer has a large amount and a strong intensity, while light rays emitted from the non-field-of-view concentration area and falling into the sight of the viewer has a small amount and a weak intensity. Thus in the image viewed by the viewer, the brightness of the area corresponding to the field-of-view concentration area is higher than the brightness of the area corresponding to the non-field-of-view concentration area. That is, the image viewed by the viewer has poor brightness uniformity, which brings bad viewing experience to the viewer.

SUMMARY

An object of the present disclosure is to provide an improved display device.

In order to achieve the above object, an embodiment of the present disclosure provides a display device, comprising: a display panel, and a grating layer arranged inside or outside of the display panel. Along a direction pointing from a center of a sight concentration area of the display device to a non-sight concentration area of the display device, a grating period of the grating layer decreases gradually, and when incident light incident on the grating layer is diffracted in an area of the grating layer corresponding to the non-sight concentration area of the display device, the obtained light of non-zero-order diffraction falls into sight of a viewer.

A grating layer is arranged in the display device provided in the present disclosure, and along a direction pointing from a center of a sight concentration area of the display device to a non-sight concentration area of the display device, a grating period of the grating layer decreases gradually. Thus in the direction pointing from the center of the sight concentration area to the non-sight concentration area, diffraction angle of the non-zero-order diffraction obtained by the incident light incident on the grating layer being diffracted on the grating layer increases gradually. When the incident light is diffracted in the area of the grating layer corresponding to the non-sight concentration area, the obtained light of non-zero-order diffraction deflects towards the sight of the viewer, so that when the incident light is diffracted in the area of the grating layer corresponding to the non-sight concentration area, the obtained light of non-zero-order diffraction falls into the sight of the viewer.

BRIEF DESCRIPTION OF DRAWINGS

The figures described herein provide further understanding of the present disclosure and form a part of the present disclosure. Exemplary embodiments of the present disclosure and descriptions thereof are used for explaining the present disclosure, but they do not intend to inappropriately define the present disclosure. In the figures.

DETAILED DESCRIPTION

In order to further describe the display device provided in embodiments of the present disclosure, detailed descriptions are given below with reference to the figures of the description.

Figure 1:
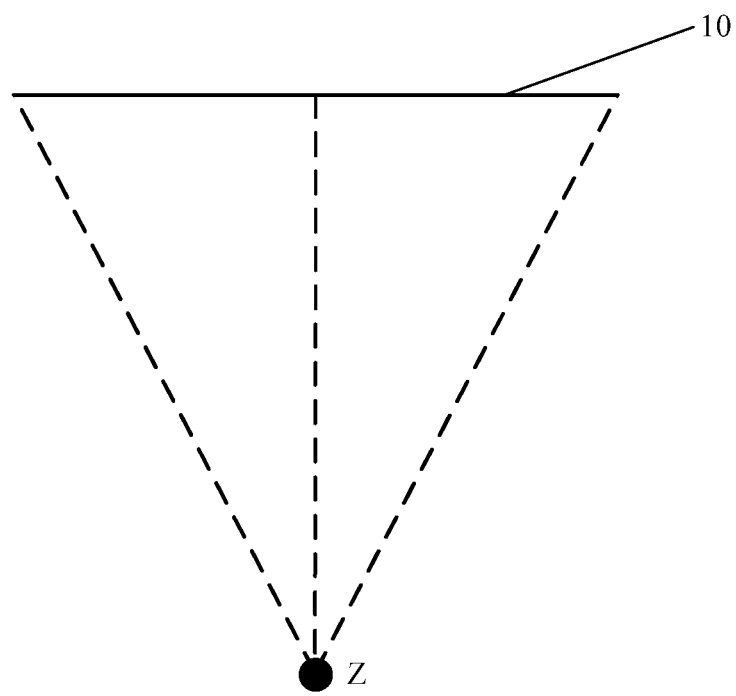
FIG. 1 schematically shows a positional relationship between a display device and a viewer.
Figure 2:
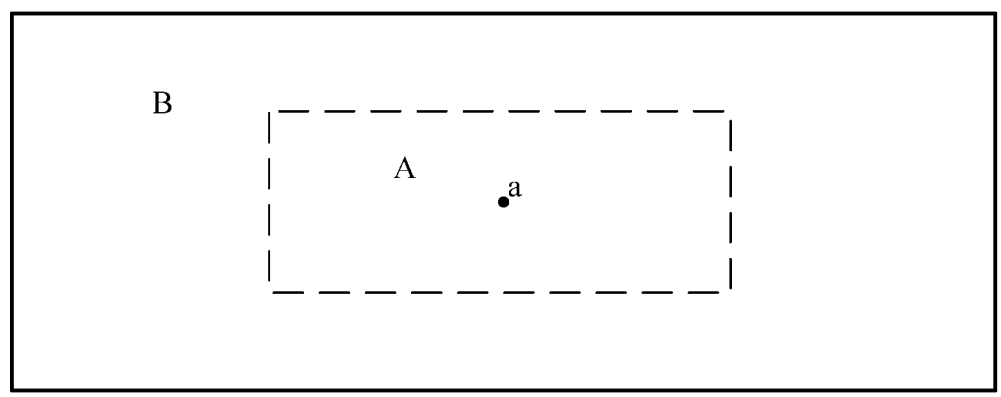
FIG. 2 is a plane graph of the display device of FIG. 1.
Figure 3:
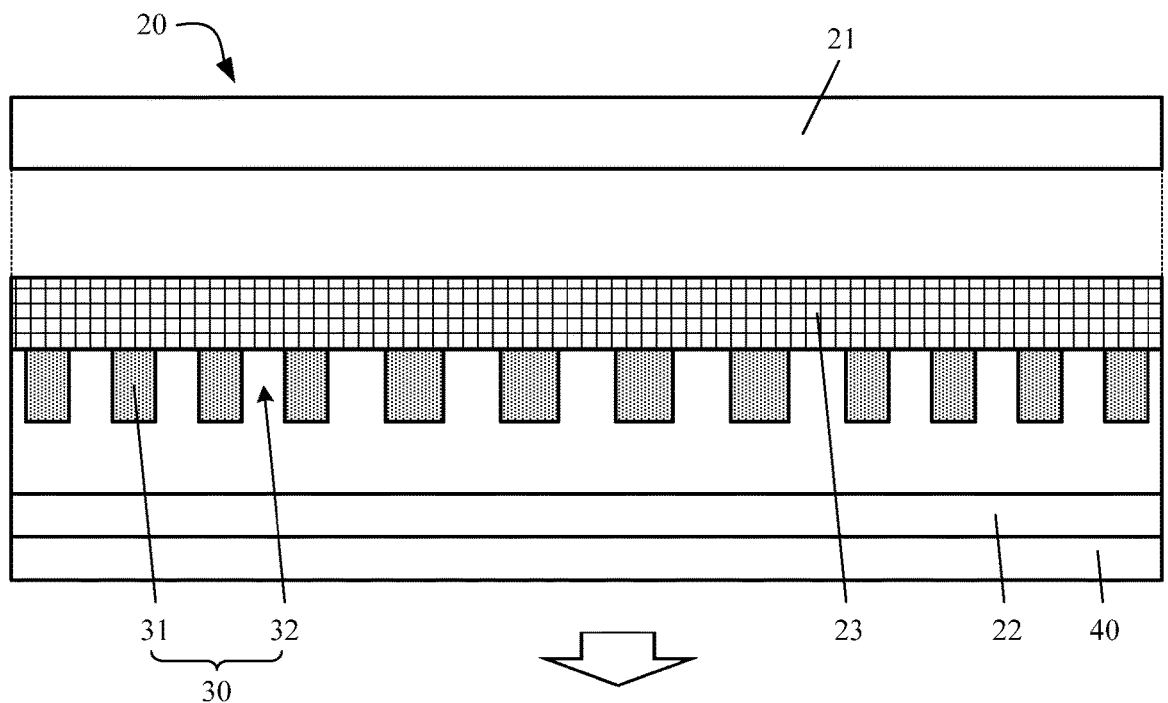
FIG. 3 is a sectional view of a display device provided in an embodiment of the present disclosure.

In the figures, the following reference signs are used:
10—display device
20—display panel
21—first substrate
22—second substrate
23—color film layer
24—R pixel
25—G pixel
26—B pixel
30—grating layer
31—grating bulge
32—gap
33—R grating area
34—G grating area
35—B grating area
40—light scattering film Referring to FIGS. 1-3, a display device 10 provided in an embodiment of the present disclosure comprises: a display panel 20, and a grating layer 30 arranged inside or outside of the display panel 20. Along a direction pointing from a center a of a sight concentration area A of the display device 10 to a non-sight concentration area B of the display device 10, a grating period of a grating layer 30 decreases gradually. When incident light incident on the grating layer 30 is diffracted in an area of the grating layer 30 corresponding to the non-sight concentration area B of the display device 10, obtained light of non-zero-order diffraction deflects towards a sight of a viewer Z.

It shall be noted that the display device 10 provided in the embodiment of the present disclosure can be a flat surface display device, a curved-surface display device, a 3D display device, a near eye display device, an AR/VR display device, etc. Particularly, in the embodiment of the present disclosure, detailed descriptions are given with the example that the display device 10 is a flat surface display device.

For example, referring to FIGS. 1 and 2, the display device 10 provided in the embodiment of the present disclosure is a flat surface display device, in front of which there is a viewing area, and the display device 10 includes a sight concentration area A and a non-sight concentration area B. When the viewer Z is viewing an image displayed by the display device 10 in the viewing area, sight of the viewer Z concentrates in the sight concentration area A, so intensity of light emitted from the sight concentration area A of the display device 10 and falling into the sight of the viewer is greater than intensity of light emitted from the non-sight concentration area B of the display device 10 and falling into the sight of the viewer.

Referring to FIG. 3, the display device 10 comprises a display panel 20 and a grating layer 30. The display panel 20 can be a liquid crystal display panel or an OLED (Organic Light-Emitting Diode) display panel, a PDP (Plasma Display Panel), a CRT (Cathode Ray Tube) display panel, etc. The grating layer 30 is arranged inside or outside of the display panel 20. For example, the display device 10 is a liquid crystal display device, comprising a back light source and a display panel 20 at a light emergent side of the back light source. The display panel 20 comprises a first substrate 21 and a second substrate 22 arranged opposite to each other. The grating layer 30 can be arranged between the first substrate 21 and the second substrate 22, or the grating layer 30 can be arranged on a side of the first substrate 21 facing away from the second substrate 22, or, the grating layer 30 can be arranged on a side of the second substrate 22 facing away from the first substrate 22, or the grating layer 30 can be arranged on the light emergent side of the back light source.

Along a direction pointing from a center a of a sight concentration area A to a non-sight concentration area B, a grating period of the grating layer 30 decreases gradually, namely, it can be considered that from the center a of the sight concentration area A to an edge of the display device 10, the grating period of the grating layer 30 decreases gradually. As shown in FIG. 2, the sight concentration area A is at the middle of the display device 10, and the non-sight concentration area B surrounds the sight concentration area A, and from the center a of the sight concentration area A to an upper edge of the display device 10 in FIG. 2, the grating period of the grating layer 30 decreases gradually; a central point of the sight concentration area A is point a in FIG. 2, and from the center a of the sight concentration area A to a lower edge of the display device 10 in FIG. 2, the grating period of the grating layer 30 decreases gradually; the central point of the sight concentration area A is point a in FIG. 2, and from the center a of the sight concentration area A to a left edge of the display device 10 in FIG. 2, the grating period of the grating layer 30 decreases gradually; and from the center a of the sight concentration area A to a right edge of the display device 10 in FIG. 2, the grating period of the grating layer 30 decreases gradually, so that when the incident light incident on the grating layer 30 is diffracted in an area of the grating layer 30 corresponding to the non-sight concentration area B, the obtained light of non-zero-order diffraction falls into the sight of the viewer.

A grating layer 30 is arranged in the display device 10 provided in the embodiment of the present disclosure, incident light incident on the grating layer 30 is diffracted at the grating layer 30 to obtain a kth-order diffraction (k=0,±1,±2 . . . ), and a relationship between a diffraction angle θ of the kth-order diffraction and a grating period P of the grating layer usually satisfies the formula of:

$$\sin\theta = \sin\theta_0 + \frac{k\lambda}{P}, k = 0, \pm 1, \pm 2 \ldots \quad (1)$$

In formula (1), $\theta_0$ is an incident angle of the incident light incident on the grating layer 30, and λ, is a wavelength of the incident light incident on the grating layer 30.

According to formula (1), when the incident angle $\theta_0$ of the incident light incident on the grating layer 30 is fixed, with respect to the zero-order diffraction, the diffraction angle θ of the zero-order diffraction equals to the incident angle $\theta_0$ of the incident light incident on the grating layer 30, and the grating period P of the grating layer does not have any impact on the diffraction angle of the zero-order diffraction; with respect to a non-zero-order diffraction, such as first-order diffraction, second-order diffraction, third-order diffraction, etc., as the grating period P decreases, the diffraction angle θ of the non-zero-order diffraction increase gradually. Thus by setting different grating periods P, the diffraction angle θ of the non-zero-order diffraction can be adjusted, so that the diffracted light of the non-zero-order diffraction is emitted towards a preset direction.

For example, a display device 10 includes a sight concentration area A and a non-sight concentration area B, the sight concentration area A being at the middle of the display device 10. In order to make brightness of a left side of the sight concentration area A match brightness of the sight concentration area A in the image displayed by the display device of FIG. 2 and viewed by the viewer Z, i.e. make the amount and intensity of light rays emitted from the left side of the sight concentration area A of FIG. 2 and falling into the sight of the viewer Z match the amount and intensity of light rays emitted from the sight concentration area A of FIG. 2 and falling into the sight of the viewer Z, the grating period of the grating layer 30 at the left side of the sight concentration area A of FIG. 2 can be set. For example, light emitted from the sight concentration area A and falling into the sight of the viewer Z can be considered as being directed at the sight of the viewer Z, namely, it can be considered that light emitted from the sight concentration area A and falling into the sight of the viewer Z is the light of zero-order diffraction obtained by the incident light passing through the grating layer 30 corresponding to the sight concentration area A; while light emitted from the left side of the sight concentration area A and falling into the sight of the viewer Z needs to be deflected so as to fall into the sight of the viewer Z, namely, it can be considered that light emitted from the left side of the sight concentration area A and falling into the sight of the viewer Z is the light of non-zero-order diffraction obtained by the incident light passing through the grating layer 30 corresponding to the left side of the sight concentration area A. Correspondingly, the grating period of the grating layer 30 at the left side of the sight concentration area A of FIG. 2 can be made smaller than the grating period of the grating layer 30 corresponding to the sight concentration area A, the non-zero-order diffraction obtained by the incident light being diffracted on the grating layer 30 corresponding to the left side of the sight concentration area A of FIG. 2 can be made to have an appropriate diffraction angle, and light of the non-zero-order diffraction is made to deflect towards the sight of the viewer Z so as to increase the amount and intensity of light rays emitted from the left side of the sight concentration area A of FIG. 2 and falling into the sight of the viewer Z, such that the amount and intensity of light rays emitted from the left side of the sight concentration area A of FIG. 2 and falling into the sight of the viewer Z match the amount and intensity of light rays emitted from the sight concentration area A of FIG. 2 and falling into the sight of the viewer Z.

Correspondingly, in order to make the brightness of a right side of the sight concentration area A match the brightness of the sight concentration area A in the image displayed by the display device of FIG. 2 and viewed by the viewer Z, i.e. make the amount and intensity of light rays emitted from the right side of the sight concentration area A of FIG. 2 and falling into the sight of the viewer Z match the amount and intensity of light rays emitted from the sight concentration area A of FIG. 2 and falling into the sight of the viewer Z, the grating period of the grating layer 30 at the right side of the sight concentration area A of FIG. 2 can be set. For example, light emitted from the sight concentration area A and falling into the sight of the viewer Z can be considered as being directed at the sight of the viewer Z, namely, it can be considered that light emitted from the sight concentration area A and falling into the sight of the viewer Z is the light of zero-order diffraction obtained by the incident light passing through the grating layer 30 corresponding to the sight concentration area A; while light emitted from the right side of the sight concentration area A and falling into the sight of the viewer Z needs to be deflected so as to fall into the sight of the viewer Z, namely, it can be considered that light emitted from the right side of the sight concentration area A and falling into the sight of the viewer Z is the light of non-zero-order diffraction obtained by the incident light passing through the grating layer 30 corresponding to the right side of the sight concentration area A. Correspondingly, the grating period of the grating layer 30 at the right side of the sight concentration area A of FIG. 2 can be made smaller than the grating period of the grating layer 30 corresponding to the sight concentration area A, the non-zero-order diffraction obtained by the incident light being diffracted on the grating layer 30 corresponding to the right side of the sight concentration area A of FIG. 2 can be made to have an appropriate diffraction angle, and light of the non-zero-order diffraction is made to deflect towards the sight of the viewer Z so as to increase the amount and intensity of light rays emitted from the right side of the sight concentration area A of FIG. 2 and falling into the sight of the viewer Z, such that the amount and intensity of light rays emitted from the right side of the sight concentration area A of FIG. 2 and falling into the sight of the viewer Z match the amount and intensity of light rays emitted from the sight concentration area A of FIG. 2 and falling into the sight of the viewer Z.

In order to make the brightness of an upper side of the sight concentration area A match the brightness of the sight concentration area A in the image displayed by the display device of FIG. 2 and viewed by the viewer Z, i.e. make the amount and intensity of light rays emitted from the upper side of the sight concentration area A of FIG. 2 and falling into the sight of the viewer Z match the amount and intensity of light rays emitted from the sight concentration area A of FIG. 2 and falling into the sight of the viewer Z, the grating period of the grating layer 30 at the upper side of the sight concentration area A of FIG. 2 can be set. For example, light emitted from the sight concentration area A and falling into the sight of the viewer Z can be considered as being directed at the sight of the viewer Z, namely, it can be considered that light emitted from the sight concentration area A and falling into the sight of the viewer Z is the light of zero-order diffraction obtained by the incident light passing through the grating layer 30 corresponding to the sight concentration area A; while light emitted from the upper side of the sight concentration area A and falling into the sight of the viewer Z needs to be deflected so as to fall into the sight of the viewer Z, namely, it can be considered that light emitted from the upper side of the sight concentration area A and falling into the sight of the viewer Z is the light of non-zero-order diffraction obtained by the incident light passing through the grating layer 30 corresponding to the upper side of the sight concentration area A. Correspondingly, the grating period of the grating layer 30 at the upper side of the sight concentration area A of FIG. 2 can be made smaller than the grating period of the grating layer 30 corresponding to the sight concentration area A, the non-zero-order diffraction obtained by the incident light being diffracted on the grating layer 30 corresponding to the upper side of the sight concentration area A of FIG. 2 can be made to have an appropriate diffraction angle, and light of the non-zero-order diffraction is made to deflect towards the sight of the viewer Z so as to increase the amount and intensity of light rays emitted from the upper side of the sight concentration area A of FIG. 2 and falling into the sight of the viewer Z, such that the amount and intensity of light rays emitted from the upper side of the sight concentration area A of FIG. 2 and falling into the sight of the viewer Z match the amount and intensity of light rays emitted from the sight concentration area A of FIG. 2 and falling into the sight of the viewer Z.

In order to make the brightness of a lower side of the sight concentration area A match the brightness of the sight concentration area A in the image displayed by the display device of FIG. 2 and viewed by the viewer Z, i.e. make the amount and intensity of light rays emitted from the lower side of the sight concentration area A of FIG. 2 and falling into the sight of the viewer Z match the amount and intensity of light rays emitted from the sight concentration area A of FIG. 2 and falling into the sight of the viewer Z, the grating period of the grating layer 30 at the lower side of the sight concentration area A of FIG. 2 can be set. For example, light emitted from the sight concentration area A and falling into the sight of the viewer Z can be considered as being directed at the sight of the viewer Z, namely, it can be considered that light emitted from the sight concentration area A and falling into the sight of the viewer Z is the light of zero-order diffraction obtained by the incident light passing through the grating layer 30 corresponding to the sight concentration area A; while light emitted from the lower side of the sight concentration area A and falling into the sight of the viewer Z needs to be deflected so as to fall into the sight of the viewer Z, namely, it can be considered that light emitted from the lower side of the sight concentration area A and falling into the sight of the viewer Z is the light of non-zero-order diffraction obtained by the incident light passing through the grating layer 30 corresponding to the lower side of the sight concentration area A. Correspondingly, the grating period of the grating layer 30 at the lower side of the sight concentration area A of FIG. 2 can be made smaller than the grating period of the grating layer 30 corresponding to the sight concentration area A, the non-zero-order diffraction obtained by the incident light diffracting on the grating layer 30 corresponding to the lower side of the sight concentration area A of FIG. 2 can be made to have an appropriate diffraction angle, and light of the non-zero-order diffraction is made to deflect towards the sight of the viewer Z so as to increase the amount and intensity of light rays emitted from the lower side of the sight concentration area A of FIG. 2 and falling into the sight of the viewer Z, such that the amount and intensity of light rays emitted from the lower side of the sight concentration area A of FIG. 2 and falling into the sight of the viewer Z match the amount and intensity of light rays emitted from the sight concentration area A of FIG. 2 and falling into the sight of the viewer Z.

Figure 5:
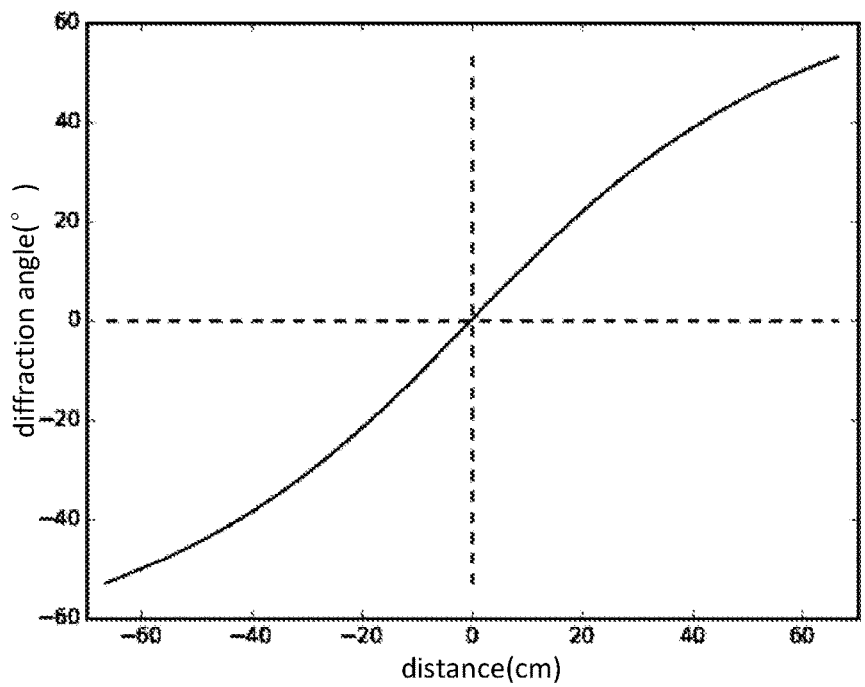
FIG. 5 is a graph of diffraction angles of first-order diffraction at different positions of the display device.

For example, suppose that the display device 10 is a flat surface display device of 60 inches, and the flat surface display device has a width of 132.83 cm. Left and right direction as shown in FIG. 2 can be assumed to be a width direction of the flat surface display device, the sight concentration area A is at the middle of the flat surface display device, and the center a of the sight concentration area A corresponds to a center of the flat surface display device. FIG. 5 is a graph of relationship between angles with which light of first-order diffraction obtained by the incident light being diffracted at different positions of the grating layer 30 need to be deflected so as to fall into the sight of the viewer Z and positions of the display device 10 along a left and right direction shown in FIG. 2, namely, along the left and right direction shown in FIG. 2, a graph of relationship between the diffraction angle θ needed for the light of first-order diffraction obtained by the incident light being diffracted at different positions of the grating layer 30 to fall into the sight of the viewer Z and positions of the display device 10. For example, along the left and right direction of FIG. 2, at a position on the grating layer 30 that is 40 cm away from the center of the display device 10, the diffraction angle θ of the first-order diffraction obtained by the incident light being diffracted at the position of the grating layer 30 shall reach 35°. By setting the grating period at the position of the grating layer 30 and making the diffraction angle θ of the first-order diffraction obtained by the incident light being diffracted at the position of the grating layer 30 to reach 35°, light of the first-order diffraction obtained by the incident light being diffracted at the position of the grating layer 30 can be made to fall into the sight of the viewer.

It can be seen that a grating layer 30 is arranged in the display device 10 provided in the embodiment of the present disclosure, and along a direction pointing from the center a of the sight concentration area A of the display device 10 to the non-sight concentration area B of the display device 10, the grating period of the grating layer 30 decreases gradually. Thus in a direction pointing from the center a of the sight concentration area A to the non-sight concentration area B, the diffraction angle θ of the non-zero-order diffraction obtained by the incident light being diffracted on the grating layer 30 increases gradually, when the incident light is diffracted in the area of the grating layer 30 corresponding to the non-sight concentration area B, the obtained light of non-zero-order diffraction deflects towards the sight of the viewer Z, so that when the incident light is diffracted in the area of the grating layer 30 corresponding to the non-sight concentration area B, the obtained light of non-zero-order diffraction falls into the sight of the viewer Z. Hence, the amount and intensity of light rays emitted from the non-sight concentration area B of the display device 10 and falling into the sight of the viewer Z can be increased, so that the amount of light rays emitted from the non-sight concentration area B of the display device 10 and falling into the sight of the viewer Z matches the amount of light rays emitted from the sight concentration area A of the display device 10 and falling into the sight of the viewer Z, and that the intensity of light emitted from the non-sight concentration area B of the display device 10 and falling into the sight of the viewer Z matches the intensity of light emitted from the sight concentration area A of the display device 10 and falling into the sight of the viewer Z, thereby reducing the difference between the brightness of a region of the image as viewed by the viewer Z corresponding to the sight concentration area A and the brightness of a region of the image as viewed by the viewer Z corresponding to the non-sight concentration area B, improving brightness uniformity of the image viewed by the viewer Z, improving viewing experience of the viewer Z and bringing more real and comfortable viewing experience to the viewer Z.

In addition, in the prior art, microprisms or microlenses are usually used to control propagation of light within the display device 10, thereby realizing control to light emitted by the display device 10. That is, in the prior art, structures designed on the basis of geometrical optics principle are usually used to control propagation of light within the display device 10. However, as the requirements on the resolution, etc. of the display device 10 become higher, and with the development of the curved surface display device, 3D display device, near eye display device, and AR/VR display device, light within the display device 10 will usually experience diffraction effect and interference effect during propagation, while the structure designed on the basis of geometrical optics principle has limited ability in controlling propagation of light in the display device 10, so it cannot well control propagation of light in the display device 10.

In the display device 10 provided in the embodiment of the present disclosure, the grating layer 30 arranged inside or outside of the display panel 20 is used to control propagation of light in the display device 10, thereby realizing control to the light emitted by the display device 10, that is, in the embodiment of the present disclosure, a structure designed on the basis of the physical optics principle is used to control propagation of light in the display device 10. Compared to the structure designed on the basis of the geometrical optics principle used for controlling propagation of light in the display device 10 in the prior art, the structure designed on the basis of the physical optics principle has higher ability in controlling propagation of light in the display device 10, so it can better control propagation of light in the display device 10, and improve the effect of controlling of light propagation in the display device 10.

In practical application, the positions of the sight concentration area A and the non-sight concentration area B will change depending on the different functions of the display device 10 and the different positions of the viewing area in front of the display device 10. For example, for some display devices 10, the sight concentration area A can be at the left side in FIG. 2, and the non-sight concentration area B is at the right side in FIG. 2. Alternatively, for some display devices 10, the sight concentration area A can be at the right side in FIG. 2, and the non-sight concentration area B is at the left side in FIG. 2. The position of the grating layer 30 can be adaptively designed according to the positions of the sight concentration area A and the non-sight concentration area B.

It shall be pointed out that the incident light incident on the grating layer 30 is diffracted at the grating layer 30 to obtain a k-order diffraction (k=0,±1,±2 . . . ). When adjusting a light emergent direction of a certain area of the display device 10, the grating period in an area of the grating layer 30 corresponding to the certain area is usually adjusted so as to adjust a diffraction angle of a non-zero-order diffraction obtained by diffraction occurred when passing through the area of the grating layer 30 corresponding to the certain area. For example, usually the grating period in the area of the grating layer 30 corresponding to the certain area is adjusted so as to adjust diffraction angles of first-order diffraction, second-order diffraction, third-order diffraction, and so on. In practical applications, the incident light incident on the grating layer 30 is diffracted at the grating layer 30 to obtain a k-order diffraction (k=0,±1,±2 . . . ) wherein the zero-order diffraction has the highest intensity, and as |k| increases, the intensity of the k-order diffraction decreases gradually, and generally speaking, there is a difference of one or several orders of magnitude between the intensity of second-order diffraction and the intensity of first-order diffraction, i.e. the intensity of the second-order diffraction is much smaller than that of the first-order diffraction. Therefore, when adjusting the diffraction angle of the non-zero diffraction obtained by diffraction occurred when passing through the area of the grating layer 30 corresponding to the certain area, adjustment only to the diffraction angle of the first-order diffraction may be sufficient.

In an embodiment of the present disclosure, an example is described in which a diffraction angle of a first-order diffraction obtained by diffraction of the incident light passing through the grating layer 30 is adjusted, and an intensity of a zero-order diffraction and an intensity of a first-order diffraction obtained by diffraction of the incident light passing through the grating layer 30 are respectively adjusted.

In the above embodiment, according to different functions of the display device 10 and different positions of the viewing area in front of the display device 10, the grating layer 30 can be arranged in different ways. Three exemplary arrangements of the grating layer 30 will be given below, but the present disclosure is not limited to these three ways.

Figure 4:
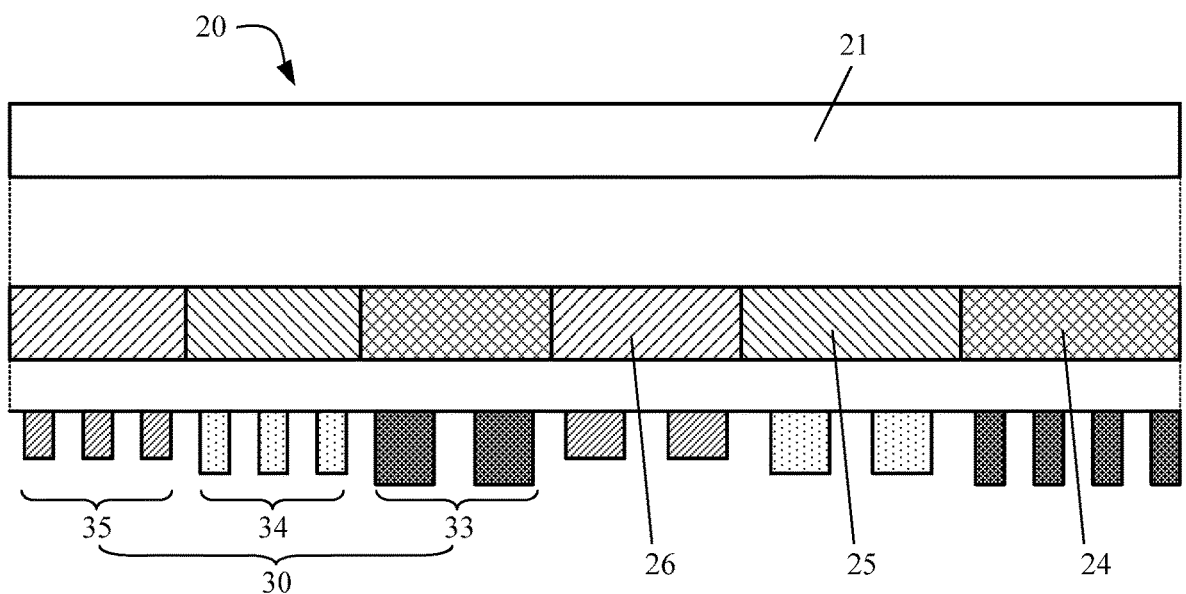
FIG. 4 is a sectional view of another display device provided in an embodiment of the present disclosure.
Figure 6:
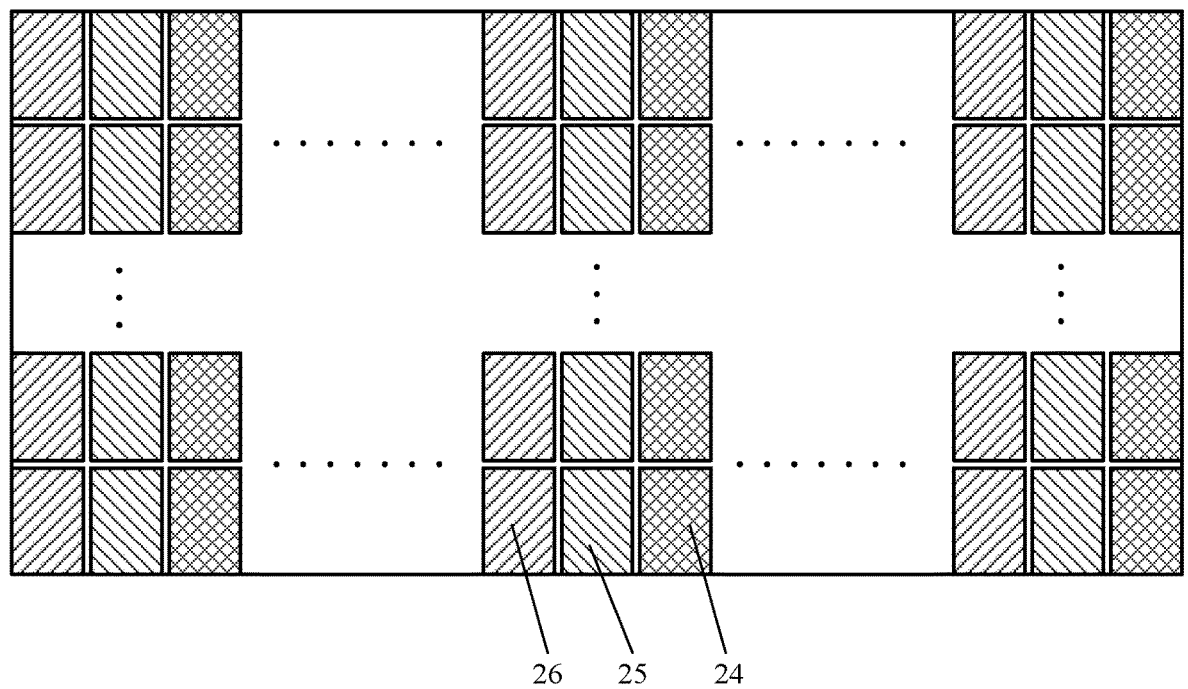
FIG. 6 shows a pixel arrangement of a display device provided in an embodiment of the present disclosure.
Figure 7:
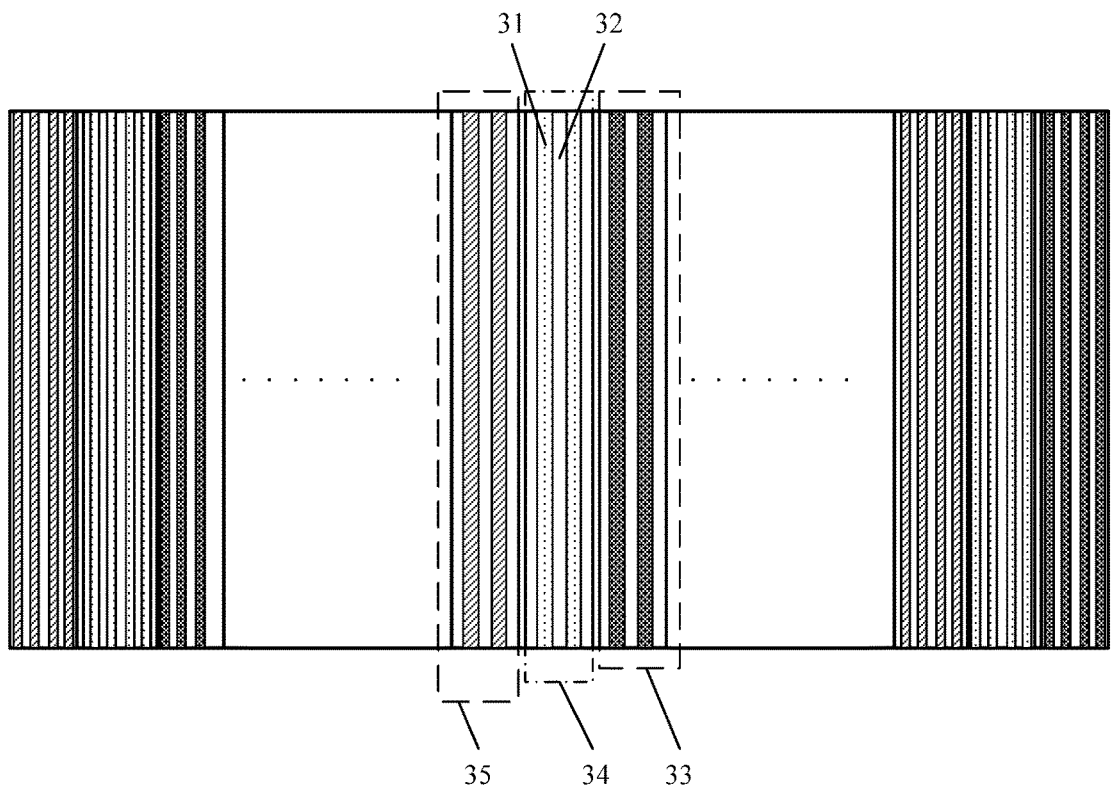
FIG. 7 is a structural diagram of a grating layer applied to the display device of FIG. 6.

In an arrangement of the grating layer 30, referring to FIGS. 4, 6 and 7, the display device 10 comprises a plurality of R pixels 24, a plurality of G pixels 25 and a plurality of B pixels 26, and the grating layer 30 comprises: a R grating region 33 corresponding to the R pixels 24, a G grating region 34 corresponding to the G pixels 25, and a B grating region 35 corresponding to the B pixels 26. A center a of the sight concentration area A corresponds to a center of the display device 10, and along a lateral direction of the display device 10, from the center of the display device 10 to both sides of the display device 10, a grating period of the R grating region 33, a grating period of the G grating region 34 and a grating period of the B grating region 35 respectively decrease gradually.

Specifically, for example, the display device 10 is a flat surface display device of 70 inches, and the display device 10 has a width of 154.97 cm and a height of 87.17 cm. For example, as shown in FIG. 6, the left and right direction in FIG. 6 is a width direction of the display device 10, and the up and down direction in FIG. 6 is a height direction of the display device 10, a viewing area of the display device 10 is right in front of the display device 10 and is facing a center of the display device 10 in the width direction. The sight concentration area A is at a middle of the display device 10 along its width direction, i.e. the sight concentration area A is at a middle of the display device 10 along the left and right direction shown in FIG. 6, a center a of the sight concentration area A corresponds to the center of the display device 10, and the non-sight concentration areas B are at the left and right sides of the sight concentration area A in FIG. 6.

The lateral direction of the display device 10 can be considered as a direction parallel to a line between both eyes of a viewer Z, and a longitudinal direction of the display device 10 can be considered as a direction perpendicular to the line between the eyes of the viewer Z. As for the above display device 10, its width direction is parallel to the line between the eyes of the viewer Z, in other words, the left and right direction in FIG. 6 is the lateral direction of the display device 10, and the up and down direction in FIG. 6 is the longitudinal direction of the display device 10.

When the viewer Z is viewing an image displayed by the display device 10, a distance between the viewer Z and the display device 10 may be greater than 0 m and smaller than 500 m. In order to enable the viewer Z to have a good viewing angle, the distance between the viewer Z and the display device 10 may optionally be 1.5 m.

In this case, when the viewer Z is viewing an image displayed by the display device 10, the sight of the viewer Z is concentrated on the middle of the display device 10 along its width direction, i.e. along the left and right direction of FIG. 6, the sight of the viewer Z is concentrated on the middle of the display device 10.

Referring to FIGS. 6 and 7, the display device 10 comprises a plurality of R pixels 24, a plurality of G pixels 25 and a plurality of B pixels 26, and the grating layer 30 comprises a R grating region 33 corresponding to the R pixels 24, a G grating region 34 corresponding to G pixels 25, and a B grating region 35 corresponding to B pixels 26. Along the lateral direction of the display device 10, from the center of the display device 10 to both sides of the display device 10, a grating period of the R grating region 33, a grating period of the G grating region 34 and a grating period of the B grating region 35 respectively decrease gradually. That is, along the lateral direction of the display device 10, the further from the center of the display device 10, the larger the diffraction angle of the first-order diffraction obtained by diffraction of incident light passing through the R grating region 33, the larger the diffraction angle of the first-order diffraction obtained by diffraction of the incident light passing through the G grating region 34, and the larger the diffraction angle of the first-order diffraction obtained by diffraction of the incident light passing through the B grating region 35, so that they can be corresponding to angles that light emitted from different positions of the display device 10 needs to be deflected towards the viewer Z along the lateral direction of the display device 10 as shown by the graph q1 in FIG. 8.

Figure 8:
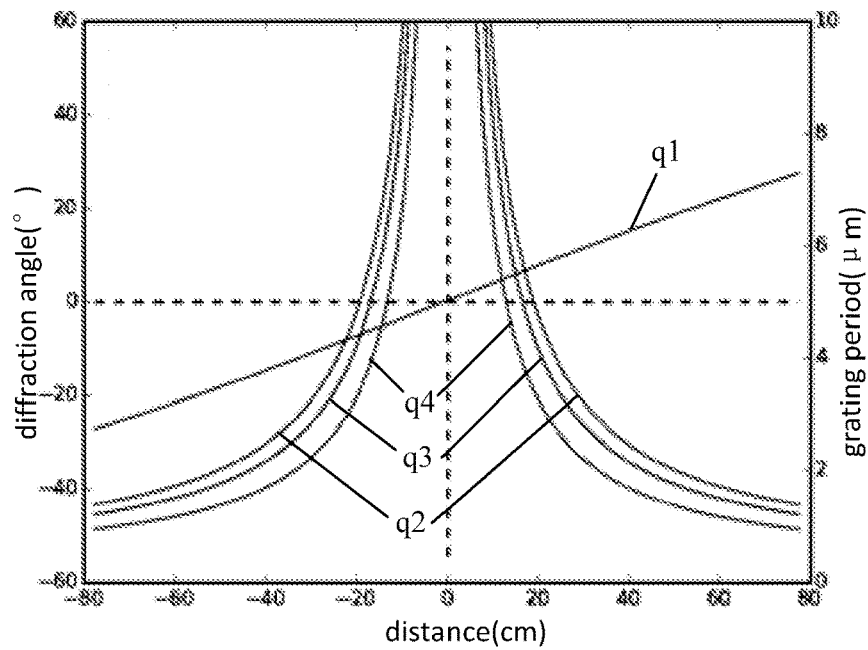
FIG. 8 is a graph of a grating period of the grating layer of FIG. 7.

As shown in FIGS. 6 and 8, along the left and right direction of FIG. 6, a distribution curve of the grating period of the R grating region 33 can be obtained according to graph q1 in FIG. 8 and formula (1), and as shown by graph q2 in FIG. 8, the area of the R grating region 33 corresponding to the middle of the display device 10 has the largest grating period, and the areas of the R grating region 33 corresponding to both sides of the display device 10 have smaller grating periods. For example, the area of the R grating region 33 corresponding to the middle of the display device 10 may have a grating period greater than 50 μm, and the areas of the R grating region 33 corresponding to both sides of the display device 10 may have grating periods of 1.5 μm.

Along the left and right direction of FIG. 6, a distribution curve of the grating period of the G grating region 34 can be obtained according to graph q1 in FIG. 8 and formula (1), and as shown by graph q3 in FIG. 8, the area of the G grating region 34 corresponding to the middle of the display device 10 has the largest grating period, and the areas of the G grating region 34 corresponding to both sides of the display device 10 have smaller grating periods. For example, the area of the G grating region 34 corresponding to the middle of the display device 10 may have a grating period greater than 50 μm, and the areas of the G grating region 34 corresponding to both sides of the display device 10 may have grating periods of 1.2 μm.

Along the left and right direction of FIG. 6, a distribution curve of the grating period of the B grating region 35 can be obtained according to graph q1 in FIG. 8 and formula (1), and as shown by graph q4 in FIG. 8, the area of the B grating region 35 corresponding to the middle of the display device 10 has the largest grating period, and the areas of the B grating region 35 corresponding to both sides of the display device 10 have smaller grating periods. For example, the area of the B grating region 35 corresponding to the middle of the display device 10 may have a grating period greater than 50 μm, and the areas of the B grating region 35 corresponding to both sides of the display device 10 may have grating periods of 1 μm.

In such an arrangement, by setting the grating period of the R grating region 33, the grating period of the G grating region 34 and the grating period of the B grating region 35, respectively, red light obtained by the R pixels 24, green light obtained by the G pixels 25, blue light obtained by the B pixels 26 can be adjusted and controlled respectively, so that along the lateral direction of the display device 10, light ray amounts and intensities of light emitted from respective areas of the display device 10 and falling into the sight of the viewer Z match, thereby reducing the difference between the brightness of a region of the image as viewed by the viewer Z corresponding to the sight concentration area A and the brightness of a region of the image as viewed by the viewer Z corresponding to the non-sight concentration area B, improving brightness uniformity of the image viewed by the viewer Z, improving viewing experience of the viewer Z and bringing more real and comfortable viewing experience to the viewer Z.

In such an arrangement, along the lateral direction of the display device 10, from the center of the display device 10 to both sides of the display device 10, the grating period of the R grating region 33, the grating period of the G grating region 34 and the grating period of the B grating region 35 respectively decrease gradually. Therefore, such an arrangement can realize adjustment of the brightness of the image viewed by the viewer Z along the lateral direction of the display device 10, thereby improving brightness uniformity of the image viewed by the viewer Z along the lateral direction of the display device 10.

In such an arrangement, the plurality of R pixels 24, the plurality of G pixels 25 and the plurality of B pixels 26 of the display device 10 can be arranged in various ways, and one of the ways of arrangement thereof is described below as an example.

Still referring to FIG. 6, along the lateral direction of the display device 10, the display device 10 comprises a plurality of columns of R pixels, a plurality of columns of G pixels and a plurality of columns of B pixels, and the columns of R pixels, the columns of G pixels, and the columns of B pixels are arranged alternately. Each column of R pixels consists of a plurality of R pixels 24 arranged along the longitudinal direction of the display device 10, each column of G pixels consists of a plurality of G pixels 25 arranged along the longitudinal direction of the display device 10, and each column of B pixels consists of a plurality of B pixels 26 arranged along the longitudinal direction of the display device 10. Specifically, as shown in FIG. 6, the left and right direction in FIG. 6 is the lateral direction of the display device 10, and the up and down direction in FIG. 6 is the longitudinal direction of the display device 10. The plurality of R pixels 24, the plurality of G pixels 25 and the plurality of B pixels 26 together form a matrix, whose columns extend along the longitudinal direction of the display device 10 and whose rows extend along the lateral direction of the display device 10. The columns of the matrix comprises a plurality of columns of R pixels, a plurality of columns of G pixels, a plurality of columns of B pixels, wherein each column of R pixels is formed by a plurality of R pixels 24 arranged along the longitudinal direction of the display device 10, each column of G pixels are formed by a plurality of G pixels 25 arranged along the longitudinal direction of the display device 10, and each column of B pixels are formed by a plurality of B pixels 26 arranged along the longitudinal direction of the display device 10, and the columns of R pixels, the columns of G pixels, and the columns of B pixels are arranged alternately along the lateral direction of the display device 10. That is, along the lateral direction of the display device 10, the R pixels 24, G pixels 25, and the B pixels 26 are arranged alternately, and along the longitudinal direction of the display device 10, the R pixels 24, G pixels 25, and the B pixels 26 are arranged successively, respectively.

When the plurality of R pixels 24, the plurality of G pixels 25 and the plurality of B pixels 26 of the display device 10 are arranged in the above-mentioned way, the grating layer 30 may be arranged as follows: still referring to FIG. 7, the grating layer 30 comprises a plurality of grating bulges 31, which are bar-shaped grating bulges, the grating bulges 31 extend along the longitudinal direction of the display device 10, and the grating bulges 31 are arranged in parallel along the lateral direction of the display device 10. Specifically, the left and right direction in FIG. 7 is the lateral direction of the display device 10, and the up and down direction in FIG. 7 is the longitudinal direction of the display device 10. The grating layer 30 comprises a plurality of grating bulges 31, and there is a gap 32 between two adjacent grating bulges 31. The grating bulges 31 comprise R grating bulges corresponding to R pixels 24, G grating bulges corresponding to G pixels 25, and B grating bulges corresponding to B pixels 26. The grating bulges 31 are bar-shaped grating bulges, and the grating bulges 31 extend along the longitudinal direction of the display device 10, that is, the R grating bulges, G grating bulges, and B grating bulges are all bar-shaped grating bulges, the R grating bulges are parallel to the direction of extension of the columns of R pixels, the G grating bulges are parallel to the direction of extension of the columns of G pixels, and the B grating bulges are parallel to the direction of extension of the columns of B pixels.

Figure 11:
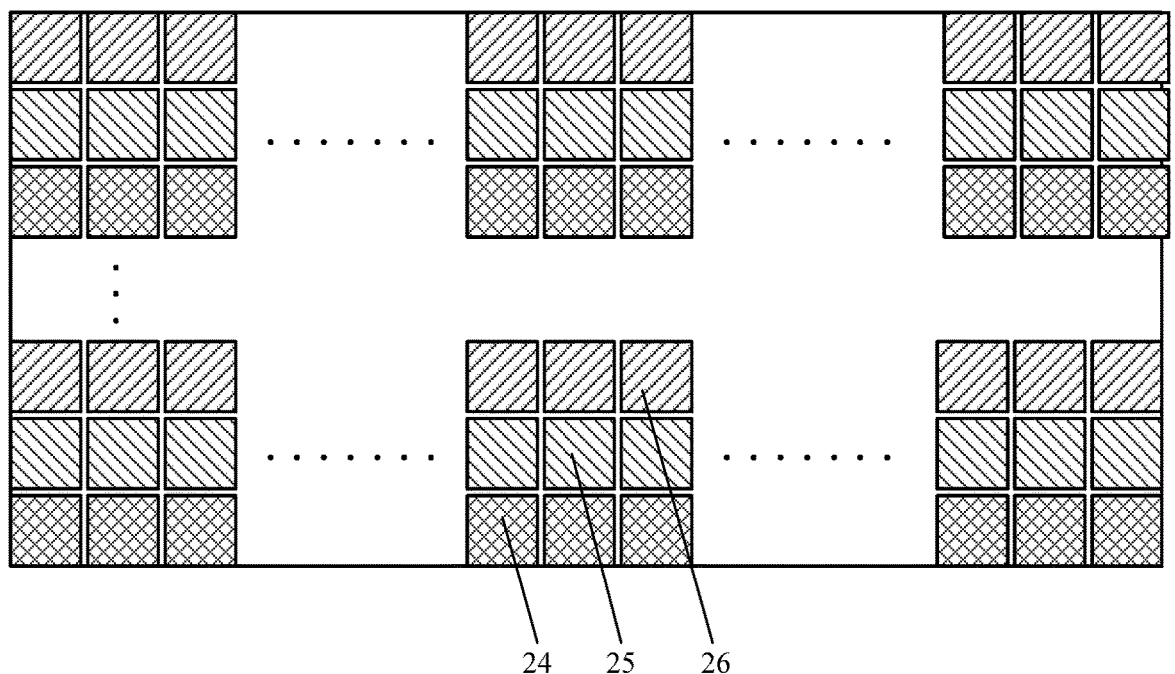
FIG. 11 shows another pixel arrangement of a display device provided in an embodiment of the present disclosure.
Figure 12:
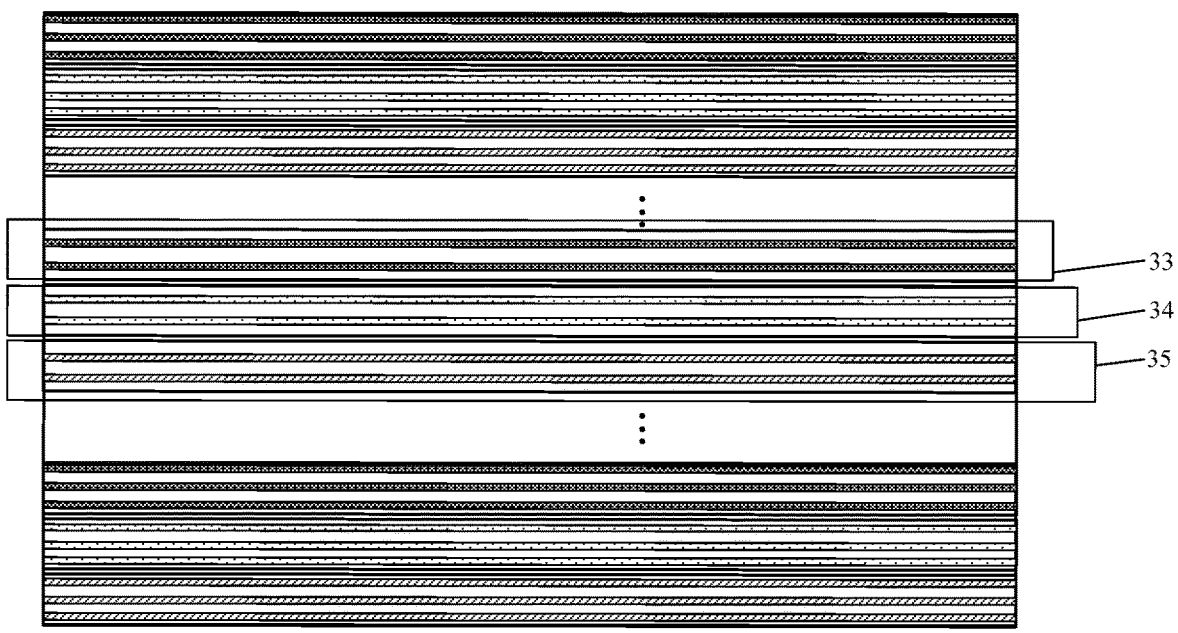
FIG. 12 is a structural diagram of a grating layer applied to the display device of FIG. 11.

In another arrangement of the grating layer 30, referring to FIGS. 3, 11 and 12, the display device 10 comprises a plurality of R pixels 24, a plurality of G pixels 25, and a plurality of B pixels 26, and the grating layer 30 comprises a R grating region 33 corresponding to the R pixels 24, a G grating region 34 corresponding to G pixels 25, and a B grating region 35 corresponding to B pixels 26. A center a of the sight concentration area A corresponds to a center of the display device 10, and along a longitudinal direction of the display device 10, from the center of the display device 10 to both sides of the display device 10, a grating period of the R grating region 33, a grating period of the G grating region 34 and a grating period of the B grating region 35 respectively decrease gradually.

Specifically, for example, the display device 10 is a flat surface display device of 70 inches, and the display device 10 has a width of 154.97 cm and a height of 87.17 cm. For example, as shown in FIG. 11, the left and right direction in FIG. 11 is a width direction of the display device 10, and the up and down direction in FIG. 11 is a height direction of the display device 10, a viewing area of the display device 10 is right in front of the display device 10 and is facing a center of the display device 10 in the width direction. The sight concentration area A is at a middle of the display device 10 along its height direction, i.e. the sight concentration area A is at a middle of the display device 10 along the up and down direction shown in FIG. 11, a center a of the sight concentration area A corresponds to the center of the display device 10, and the non-sight concentration areas B are at the upper and lower sides of the sight concentration area A in FIG. 11.

The lateral direction of the display device 10 can be considered as a direction parallel to a line between both eyes of a viewer Z, and a longitudinal direction of the display device 10 can be considered as a direction perpendicular to the line between the eyes of the viewer Z. As for the above display device 10, its width direction is parallel to the line between the eyes of the viewer Z, in other words, the left and right direction in FIG. 11 is the lateral direction of the display device 10, and the up and down direction in FIG. 11 is the longitudinal direction of the display device 10.

When the viewer Z is viewing an image displayed by the display device 10, a distance between the viewer Z and the display device 10 may be greater than 0 m and smaller than 500 m. In order to enable the viewer Z to have a good viewing angle, the distance between the viewer Z and the display device 10 may optionally be 1.5 m.

In this case, when the viewer Z is viewing an image displayed by the display device 10, the sight of the viewer Z is concentrated on the middle of the display device 10 along its height direction, i.e. along the up and down direction of FIG. 11, the sight of the viewer Z is concentrated on the middle of the display device 10.

Referring to FIGS. 11 and 12, the display device 10 comprises a plurality of R pixels 24, a plurality of G pixels 25 and a plurality of B pixels 26, and the grating layer 30 comprises a R grating region 33 corresponding to the R pixels 24, a G grating region 34 corresponding to G pixels 25, and a B grating region 35 corresponding to B pixels 26. Along a longitudinal direction of the display device 10, from the center of the display device 10 to both sides of the display device 10, a grating period of the R grating region 33, a grating period of the G grating region 34 and a grating period of the B grating region 35 respectively decrease gradually. That is, along the longitudinal direction of the display device 10, the further from the center of the display device 10, the larger the diffraction angle of the first-order diffraction obtained by diffraction of the incident light passing through the R grating region 33, the larger the diffraction angle of the first-order diffraction obtained by diffraction of the incident light passing through the G grating region 34, and the larger the diffraction angle of the first-order diffraction obtained by diffraction of the incident light passing through the B grating region 35, so that they can be corresponding to the angles that light emitted from different positions of the display device 10 needs to be deflected towards the viewer Z along the longitudinal direction of the display device 10 as shown by the graph q5 in FIG. 13.

Figure 13:
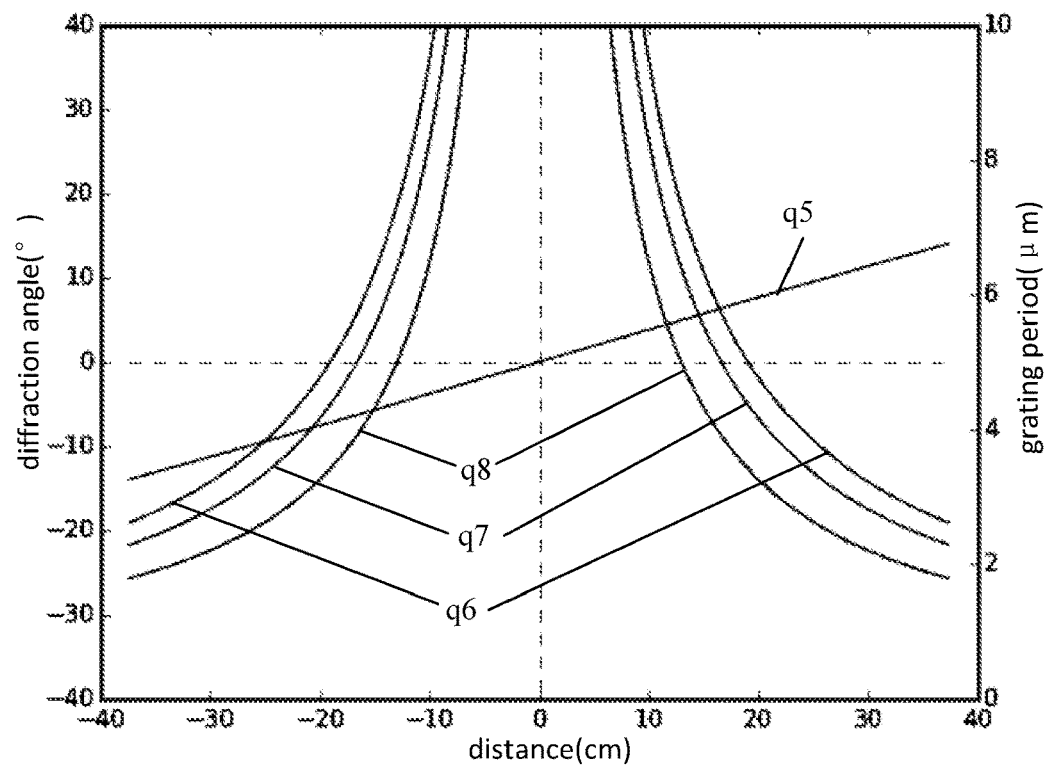
FIG. 13 is a graph of a grating period of the grating layer of FIG. 12.

As shown in FIGS. 11 and 13, along the up and down direction of FIG. 11, a distribution curve of the grating period of the R grating region 33 can be obtained according to graph q5 in FIG. 13 and formula (1), and as shown by graph q6 in FIG. 13, the area of the R grating region 33 corresponding to the middle of the display device 10 has the largest grating period, and the areas of the R grating region 33 corresponding to both sides of the display device 10 have smaller grating periods. For example, the area of the R grating region 33 corresponding to the middle of the display device 10 may have a grating period greater than 50 µm, and the areas of the R grating region 33 corresponding to both sides of the display device 10 may have grating periods of 2.5 µm.

Along the up and down direction of FIG. 11, a distribution curve of the grating period of the G grating region 34 can be obtained according to graph q5 in FIG. 13 and formula (1), and as shown by graph q7 in FIG. 13, the area of the G grating region 34 corresponding to the middle of the display device 10 has the largest grating period, and the areas of the G grating region 34 corresponding to both sides of the display device 10 have smaller grating periods. For example, the area of the G grating region 34 corresponding to the middle of the display device 10 may have a grating period greater than 50 µm, and the areas of the G grating region 34 corresponding to both sides of the display device 10 may have grating periods of 2.1 µm.

Along the up and down direction of FIG. 11, a distribution curve of the grating period of the B grating region 35 can be obtained according to graph q5 in FIG. 13 and formula (1), and as shown by graph q8 in FIG. 13, the area of the B grating region 35 corresponding to the middle of the display device 10 has the largest grating period, and the areas of the B grating region 35 corresponding to both sides of the display device 10 have smaller grating periods. For example, the area of the B grating region 35 corresponding to the middle of the display device 10 may have a grating period greater than 50 μm, and the areas of the B grating region 35 corresponding to both sides of the display device 10 may have grating periods of 1.9 μm.

In such an arrangement, by setting the grating period of the R grating region 33, the grating period of the G grating region 34 and the grating period of the B grating region 35, respectively, red light obtained by the R pixels 24, green light obtained by the G pixels 25, blue light obtained by the B pixels 26 can be adjusted and controlled respectively, so that along the longitudinal direction of the display device 10, the light ray amounts and intensities of light emitted from respective areas of the display device 10 and falling into the sight of the viewer Z match, thereby reducing the difference between the brightness of a region of the image as viewed by the viewer Z corresponding to the sight concentration area A and the brightness of a region of the image as viewed by the viewer Z corresponding to the non-sight concentration area B, improving brightness uniformity of the image viewed by the viewer Z, improving viewing experience of the viewer Z and bringing more real and comfortable viewing experience to the viewer Z.

In such an arrangement, along the longitudinal direction of the display device 10, from the center of the display device 10 to both sides of the display device 10, the grating period of the R grating region 33, the grating period of the G grating region 34 and the grating period of the B grating region 35 respectively decrease gradually. Therefore, such an arrangement can realize adjustment of the brightness of the image viewed by the viewer Z along the longitudinal direction of the display device 10, thereby improving brightness uniformity of the image viewed by the viewer Z along the longitudinal direction of the display device 10.

In such an arrangement, the plurality of R pixels 24, the plurality of G pixels 25 and the plurality of B pixels 26 of the display device 10 can be arranged in various ways, and one of the ways of arrangement thereof is described below as an example.

Still referring to FIG. 11, along the longitudinal direction of the display device 10, the display device 10 comprises a plurality of rows of R pixels, a plurality of rows of G pixels, a plurality of rows of B pixels, and the rows of R pixels, the rows of G pixels, and the rows of B pixels are arranged alternately. Each row of R pixels consists of a plurality of R pixels 24 arranged along the lateral direction of the display device 10, each row of G pixels consists of a plurality of G pixels 25 arranged along the lateral direction of the display device 10, and each row of B pixels consists of a plurality of B pixels 26 arranged along the lateral direction of the display device 10. Specifically, as shown in FIG. 11, the left and right direction in FIG. 11 is the lateral direction of the display device 10, and the up and down direction in FIG. 11 is the longitudinal direction of the display device 10. The plurality of R pixels 24, the plurality of G pixels 25 and the plurality of B pixels 26 together form a matrix, whose columns extend along the longitudinal direction of the display device 10 and whose rows extend along the lateral direction of the display device 10. The rows of the matrix comprise a plurality of rows of R pixels, a plurality of rows of G pixels and a plurality of rows of B pixels, wherein each row of R pixels is formed by a plurality of R pixels 24 arranged along the lateral direction of the display device 10, each rows of G pixels is formed by a plurality of G pixels 25 arranged along the lateral direction of the display device 10, and each row of B pixels is formed by a plurality of B pixels 26 arranged along the lateral direction of the display device 10, and the rows of R pixels, the rows of G pixels, and the rows of B pixels are arranged alternately along the longitudinal direction of the display device 10. That is, along the longitudinal direction of the display device 10, the R pixels 24, G pixels 25, and the B pixels 26 are arranged alternately, and along the lateral direction of the display device 10, the R pixels 24, G pixels 25, and the B pixels 26 are arranged successively, respectively.

When the plurality of R pixels 24, the plurality of G pixels 25 and the plurality of B pixels 26 of the display device 10 are arranged in the above-mentioned way, the grating layer 30 may be arranged as follows: still referring to FIG. 12, the grating layer 30 comprises a plurality of grating bulges 31, which are bar-shaped grating bulges, the grating bulges 31 extend along the lateral direction of the display device 10, and the grating bulges 31 are arranged in parallel along the longitudinal direction of the display device 10. Specifically, the left and right direction in FIG. 12 is the lateral direction of the display device 10, the up and down direction in FIG. 12 is the longitudinal direction of the display device 10. The grating layer 30 comprises a plurality of grating bulges 31, and there is a gap 32 between two adjacent grating bulges 31. The grating bulges 31 comprise R grating bulges corresponding to R pixels 24, G grating bulges corresponding to G pixels 25, and B grating bulges corresponding to B pixels 26. The grating bulges 31 are bar-shaped grating bulges, and the grating bulges 31 extend along the lateral direction of the display device 10. That is, the R grating bulges, G grating bulges, and B grating bulges are all bar-shaped grating bulges, the R grating bulges are parallel to the direction of extension of the rows of R pixels, the G grating bulges are parallel to the direction of extension of the rows of G pixels, and the B grating bulges are parallel to the direction of extension of the rows of B pixels.

The display device 10 employing the arrangement of the grating layer 30 as shown in FIGS. 6 and 7 can improve brightness uniformity of the image viewed by the viewer Z along the lateral direction of the display device 10, and the display device 10 employing the arrangement of the grating layer 30 as shown in FIGS. 11 and 12 can improve brightness uniformity of the image viewed by the viewer Z along the longitudinal direction of the display device 10. In practical applications, brightness uniformity of the image viewed by the viewer Z along both the lateral direction and the longitudinal direction of the display device 10 can be improved simultaneously.

Figure 14:
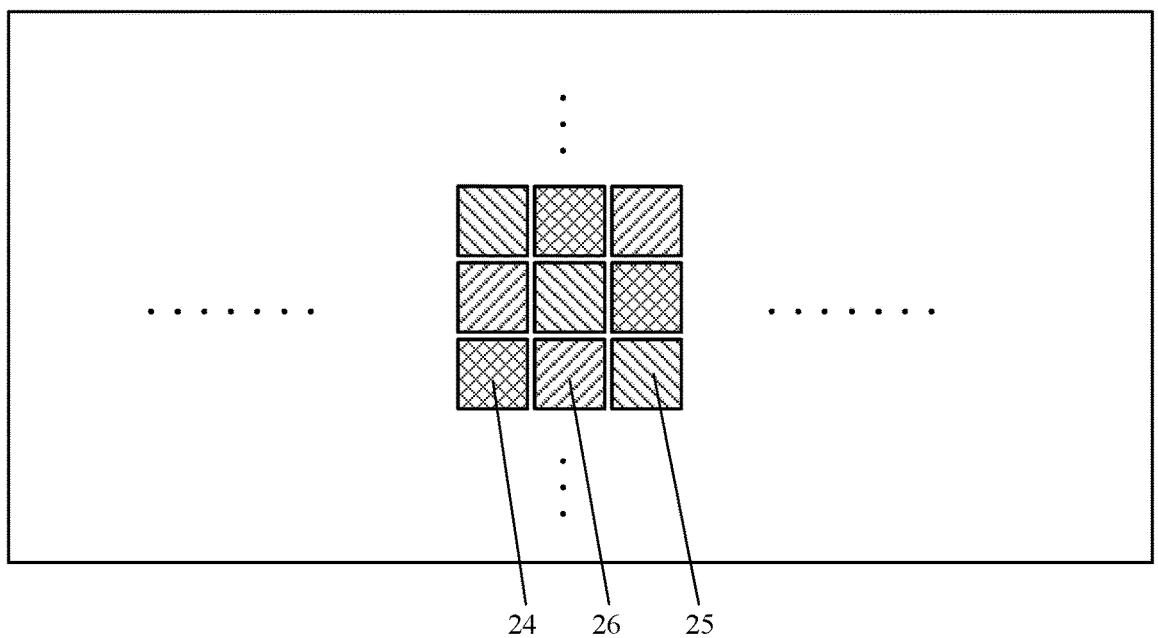
FIG. 14 shows another pixel arrangement of a display device provided in an embodiment of the present disclosure.
Figure 15:
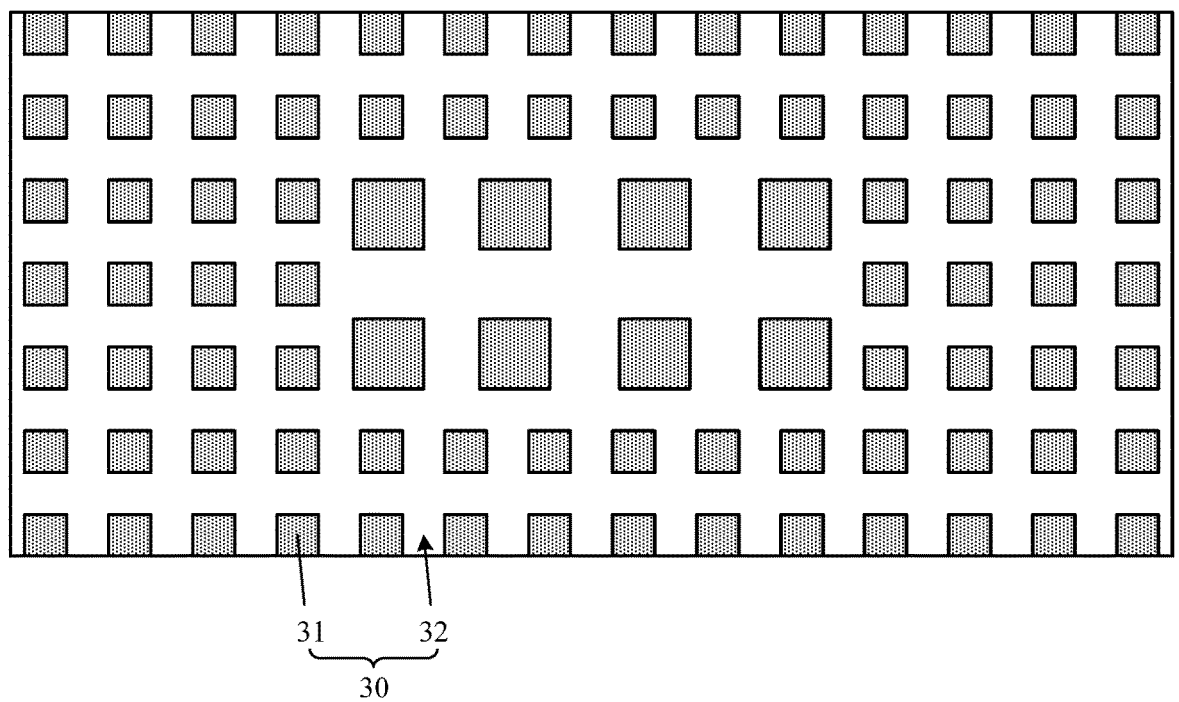
FIG. 15 is a structural diagram of a grating layer applied to the display device of FIG. 14.

In yet another arrangement of the grating layer 30, referring to FIGS. 14 and 15, the display device 10 comprises a plurality of R pixels 24, a plurality of G pixels 25 and a plurality of B pixels 26 arranged in an array, and the grating layer 30 comprises a R grating region 33 corresponding to the R pixels 24, a G grating region 34 corresponding to G pixels 25, and a B grating region 35 corresponding to B pixels 26. A center a of the sight concentration area A corresponds to a center of the display device 10, and along a longitudinal direction of the display device 10, from the center of the display device 10 to both sides of the display device 10, a grating period of the R grating region 33, a grating period of the G grating region 34 and a grating period of the B grating region 35 respectively decrease gradually; along a lateral direction of the display device 10, from the center of the display device 10 to both sides of the display device 10, the grating period of the R grating region 33, the grating period of the G grating region 34 and the grating period of the B grating region 35 respectively decrease gradually.

Specifically, for example, the display device 10 is a flat surface display device of 70 inches, and the display device 10 has a width of 154.97 cm and a height of 87.17 cm. For example, as shown in FIG. 14, the left and right direction in FIG. 14 is a width direction of the display device 10, and the up and down direction in FIG. 14 is a height direction of the display device, a viewing area of the display device 10 is right in front of the display device 10 and faces the center of the display device 10 in the width direction. When a viewer Z is viewing an image displayed by the display device 10, a distance between the viewer Z and the display device 10 may be greater than 0 m and smaller than 500 m. In order to enable the viewer Z to have a good viewing angle, the distance between the viewer Z and the display device 10 may optionally be 1.5 m. In this case, when the viewer Z is viewing the image displayed by the display device 10, the sight of the viewer Z is concentrated at the middle area of the display device 10, and a sight concentration area A faces the middle area of the display device 10, while a non-sight concentration areas B are around the sight concentration area A.

The lateral direction of the display device 10 can be considered as a direction parallel to a line between both eyes of the viewer Z, and the longitudinal direction of the display device 10 can be considered as a direction perpendicular to the line between the eyes of the viewer Z. As for the above display device 10, its width direction is parallel to the line between the eyes of the viewer Z, in other words, the left and right direction in FIG. 14 is the lateral direction of the display device 10, and the up and down direction in FIG. 14 is the longitudinal direction of the display device 10.

In such an arrangement, along the longitudinal direction of the display device 10, from the center of the display device 10 to both sides of the display device 10, the grating period of the R grating region 33, the grating period of the G grating region 34 and the grating period of the B grating region 35 respectively decrease gradually; along the lateral direction of the display device 10, from the center of the display device 10 to both sides of the display device 10, the grating period of the R grating region 33, the grating period of the G grating region 34 and the grating period of the B grating region 35 respectively decrease gradually. Therefore, along the lateral direction of the display device 10, red light, green light and blue light emitted from both sides of the display device 10 deflect towards the sight of the viewer Z, respectively, so as to increase the light ray amount and intensity of light emitted from both sides of the display device 10 along the lateral direction of the display device 10 and falls into the sight of the viewer Z, thereby adjusting brightness of the image viewed by the viewer Z along the lateral direction of the display device 10; along the longitudinal direction of the display device 10, the red light, green light and blue light emitted from both sides of the display device 10 deflect towards the sight of the viewer Z, respectively, so as to increase the light ray amount and intensity of light emitted from both sides of the display device 10 along the longitudinal direction of the display device 10 and falls into the sight of the viewer Z, thereby adjusting brightness of the image viewed by the viewer Z along the longitudinal direction of the display device 10. That is, in the display device 10 provided in such a manner, the grating period of the R grating region 33, the grating period of the G grating region 34, and the grating period of the B grating region 35 respectively vary along the lateral direction and the longitudinal direction of the display device 10, so the brightness uniformity of the image viewed by the viewer Z along both the lateral direction and the longitudinal direction of the display device 10 can be improved simultaneously.

It shall be noted that in such an arrangement, the plurality of grating bulges 31 of the grating layer 30 may be in the same layer and may be arranged in an array, and the arrangement of the plurality of grating bulges 31 also meets the requirement of arrangement along the lateral and longitudinal directions of the display device 10. In practical applications, the grating layer 30 may comprise a lateral grating layer and a longitudinal grating layer laminated to each other, wherein the lateral grating layer is arranged in the same way as the grating layer 30 in the display device 10 as provided in FIGS. 6 and 7, and the longitudinal grating layer is arranged in the same way as the grating layer 30 in the display device 10 as provided in FIGS. 11 and 12. Namely, in the grating layer 10 of the display device 10 arranged in such a manner, the lateral grating layer and the longitudinal grating layer can be arranged respectively.

In all the above-mentioned arrangements, the display device 10 comprises a plurality of R pixels 24, a plurality of G pixels 25 and a plurality of B pixels 26, and the grating layer 30 comprises a R grating region 33 corresponding to the R pixels 24, a G grating region 34 corresponding to G pixels 25, and a B grating region 35 corresponding to B pixels 26. The grating period of the R grating region 33, the grating period of the G grating region 34 and grating period of the B grating region 35 are designed respectively, namely, in the above-mentioned arrangements, the grating layer 30 is arranged according to the plurality of R pixels 24, the plurality of G pixels 25 and the plurality of B pixels 26, so that light emitted from the area of the display device 10 corresponding to the R pixels 24, light emitted from the area of the display device 10 corresponding to the G pixels 25 and light emitted from the area of the display device 10 corresponding to the B pixels 26 can be controlled, respectively, thereby further improving viewing experience of the viewer Z and bringing more real and comfortable viewing experience to the viewer Z.

It shall be noted that the display device 10 comprises a plurality of R pixels 24, a plurality of G pixels 25 and a plurality of B pixels 26, and the grating layer 30 comprises a R grating region 33 corresponding to the R pixels 24, a G grating region 34 corresponding to G pixels 25, and a B grating region 35 corresponding to B pixels 26. When providing a grating layer 30 comprising the R grating region 33, the G grating region 34 and the B grating region 35 in a 3D display device, a near eye display device or an AR/VR display device, a high degree of alignment shall be realized between the R grating region 33 and the R pixels 24, between the G grating region 34 and the G pixels 25 and between the B grating region 35 and the B pixels 26. That is, each grating bulge 31 of the grating layer 30 will not be aligned to two pixels having different colors at the same time, i.e., each grating bulge 31 of the grating layer 30 will not be aligned to an R pixel 24 and a G pixel 25 at the same time, each grating bulge 31 of the grating layer 30 will not be aligned to an R pixel 24 and a B pixel 26 at the same time, and each grating bulge 31 of the grating layer 30 will not be aligned to a G pixel 25 and a B pixel 26 at the same time.

In the above embodiment, the grating layer 30 comprises the R grating region 33 corresponding to the R pixels 24, the G grating region 34 corresponding to G pixels 25, and the B grating region 35 corresponding to B pixels 26. The R grating region 33, the G grating region 34, and the B grating region 35 can be arranged in the same layer, or the grating layer 30 may be divided into a first layer, a second layer and a third layer laminated with one another, the R grating region 33 may be in the first layer, the G grating region 34 may be in the second layer and the B grating region 35 may be in the third layer, namely, the R grating region 33, the G grating region 34, and the B grating region 35 are not arranged in the same layer. Compared to arranging the R grating region 33, the G grating region 34, and the B grating region 35 in the same layer, arranging them in different layers can avoid interference among the R grating region 33, the G grating region 34, and the B grating region 35 during manufacturing of the grating layer 30, thereby facilitating manufacturing of the grating layer 30.

In practical applications, when arranging the grating layer 30, the plurality of R pixels 24, the plurality of G pixels 25 and the plurality of B pixels 26 of the display device 10 may not be considered, namely, the grating period of the grating layer 30 only needs to satisfy the condition that along the direction pointing from the center a of the sight concentration area A to the non-sight concentration area B, the grating period of the grating layer 30 decreases gradually, and the grating layer 30 will not be designed respectively for the R pixels 24, the G pixels 25 and the B pixels 26.

In the above embodiment, by setting the grating period in respective areas of the grating layer 30, the grating period of the grating layer 30 decreases gradually from the center a of the sight concentration area A to the edge of the display device 10, so that light emitted from the non-sight concentration area B of the display device 10 can deflect towards the sight of the viewer Z, thereby increasing the light ray amount and intensity of light emitted from the non-sight concentration area B of the display device 10 and falling into the sight of the viewer Z, as a result, the amount of light rays emitted from the non-sight concentration area B of the display device 10 and falling into the sight of the viewer Z matches the amount of light rays emitted from the sight concentration area A of the display device 10 and falling into the sight of the viewer Z, and the intensity of light emitted from the non-sight concentration area B of the display device 10 and falling into the sight of the viewer Z matches the intensity of light emitted from the sight concentration area A of the display device 10 and falling into the sight of the viewer Z.

In practical applications, the display device 10 provided in the embodiment of the present disclosure is provided with a grating layer 30, and incident light incident on the grating layer 30 will be diffracted and interfered at the grating layer 30. The k-order diffraction obtained by diffraction of the incident light at the grating layer 30 will experience constructive interference or destructive interference, which is related to the thickness of the grating bulges 31 of the grating layer 30. Thus, by setting the thickness of the grating bulges 31 of the grating layer 30, diffraction of a certain order may have constructive interference or destructive interference, thereby adjusting the intensity of the diffraction of the certain order.

Generally, when a grating period and a grating duty cycle of the grating layer 30 are fixed, refractive index of a grating bulge 31 of the grating layer 30 is $n_G$, and refractive index of a filler in a gap 32 between two adjacent grating bulges 31 is $n_S$, the incident light incident on the grating layer 30 has a wavelength $\lambda$, when a thickness h of the grating layer 30 is $$h = \frac{m\lambda}{|n_G - n_S|},$$

and when in is a half integer, the zero-order diffraction obtained by diffraction of the incident light at the grating layer 30 has a destructive interference, and the first-order diffraction obtained by diffraction of the incident light at the grating layer 30 has a constructive interference; when the thickness h of the grating layer 30 is $$h = \frac{m\lambda}{|n_G - n_S|},$$

and when in is an integer, the zero-order diffraction obtained by diffraction of the incident light at the grating layer 30 has a constructive interference, and the first-order diffraction obtained by diffraction of the incident light at the grating layer 30 has a destructive interference.

Figure 16:
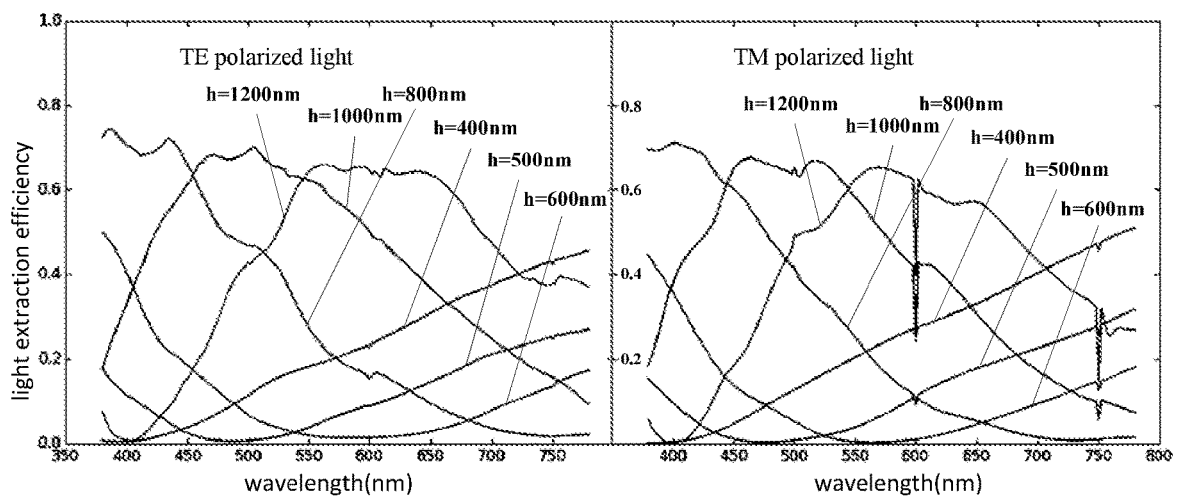
FIG. 16 is a diagram of relationship between light extraction efficiency of zero-order diffraction and a thickness of a grating bulge.
Figure 17:
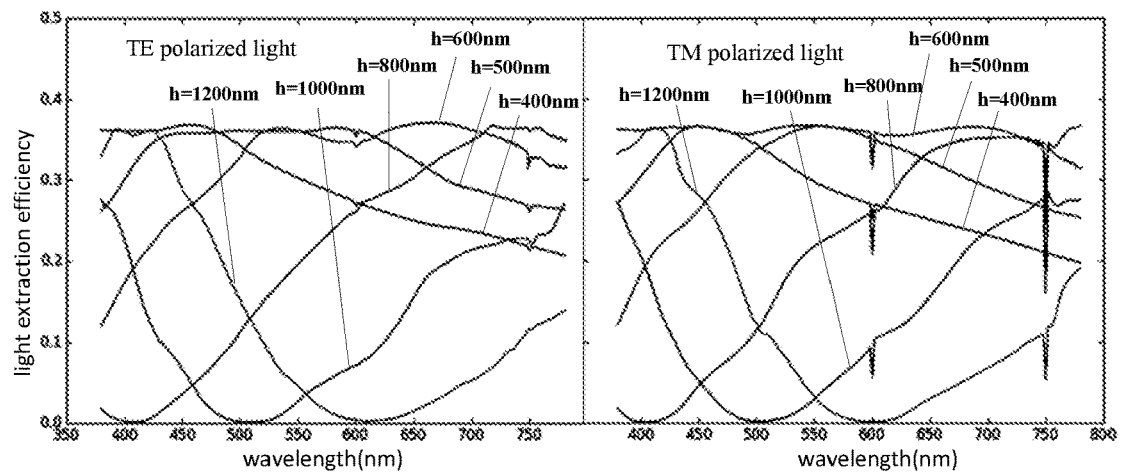
FIG. 17 is a diagram of relationship between light extraction efficiency of first-order diffraction and a thickness of a grating bulge.

For example, referring to FIGS. 16 and 17, when the grating period of the grating layer 30 is 3 μm, the grating duty cycle of the grating layer 30 is 0.5, and $|n_G - n_S|$ is 0.5, a relationship between the light extraction efficiency of the zero-order diffraction obtained by diffraction of the incident light at the grating layer 30 and the thickness of a grating bulge 31 of the grating layer 30 is as shown in FIG. 16, and a relationship between the light extraction efficiency of the first-order diffraction obtained by diffraction of the incident light at the grating layer 30 and the thickness of the grating bulge 31 of the grating layer 30 is as shown in FIG. 17. As shown by FIGS. 16 and 17, when in is an integer, e.g., when m is 1, the zero-order diffraction has constructive interference, and the first-order diffraction has destructive interference; when in is a half integer, e.g. when m is ½, the zero-order diffraction has destructive interference, and the first-order diffraction has constructive interference.

In other words, the intensity of light emitted from respective areas of the display device 10 are also related to the thicknesses of the grating bulge 31 of the grating layer 30, and according to this conclusion, by setting the thicknesses of the grating bulges 31 of the grating layer 30 corresponding to the sight concentration area A and the non-sight concentration area B, the intensity of the non-zero-order diffraction obtained by diffraction of the incident light at the non-sight concentration area B of the grating layer 30 can be increased, and accordingly, the intensity of the light emitted from the area of the display device 10 corresponding to the non-sight concentration area B and falling into the sight of the viewer Z can be increased, as a result, the intensity of light emitted from the area of the display device 10 corresponding to the non-sight concentration area B and falling into the sight of the viewer Z is made to match the intensity of light emitted from the area of the display device 10 corresponding to the sight concentration area A and falling into the sight of the viewer Z.

For example, light emitted from the sight concentration area A and falling into the sight of the viewer Z can be considered as being directed at the sight of the viewer Z, namely, it can be considered that light emitted from the sight concentration area A and falling into the sight of the viewer Z is the light of zero-order diffraction obtained by the incident light passing through an area of the grating layer 30 corresponding to the sight concentration area A; while light emitted from the non-sight concentration area B and falling into the sight of the viewer Z needs to be deflected so as to fall into the sight of the viewer Z, namely, it can be considered that light emitted from the non-sight concentration area B and falling into the sight of the viewer Z is the light of non-zero-order diffraction obtained by the incident light passing through an area of the grating layer 30 corresponding to the non-sight concentration area B. The intensity of the light emitted from the non-sight concentration area B of the display device 10 and falling into the sight of the viewer Z might be lower than the intensity of the light emitted from the sight concentration area A of the display device 10 and falling into the sight of the viewer Z. Therefore, the thicknesses of the grating bulges 31 of the grating layer 30 corresponding to the sight concentration area A and the non-sight concentration area B can be set, so that the zero-order diffraction obtained by the incident light passing through the area of the grating layer 30 corresponding to the sight concentration area A does not have complete constructive interference or complete destructive interference, and the non-zero-order diffraction obtained by the incident light passing through the area of the grating layer 30 corresponding to the non-sight concentration area B has complete interference, thereby adjusting the intensity of light of the zero-order diffraction obtained by the incident light passing through the area of the grating layer 30 corresponding to the sight concentration area A and adjusting the intensity of light of the non-zero-order diffraction obtained by the incident light passing through the area of the grating layer 30 corresponding to the non-sight concentration area B and making these two intensities match, and as a result, the intensity of light emitted from the non-sight concentration area B of the display device 10 and falling into the sight of the viewer Z matches the intensity of light emitted from the sight concentration area A of the display device 10 and falling into the sight of the viewer Z.

Specifically, it may be generally assumed that the incident light incident on the grating layer 30 is perpendicular to the grating layer 30, i.e. the incident light incident on the grating layer 30 is in collimated incidence, and the incident angle $\theta_0$ of the incident light incident on the grating layer 30 is 0°. For example, when the display device 10 is a liquid crystal display device, the display device 10 comprises a display panel 20 and a back light source which provides area light source to the display panel 20. When the area light source illuminates the display panel 20, the incidence is usually perpendicular to the display panel 20, and when the grating layer 30 is arranged inside or outside of the display panel 20, the surface light source also provides perpendicular incidence to the grating layer 30.

The grating layer 30 comprises a plurality of grating bulges 31, and the thickness $h_B$ of a grating bulge 31 corresponding to the non-sight concentration area B satisfies the formula of:

$$h_B = \frac{m_B \lambda}{|n_{GB} - n_{SB}|} \quad (2)$$

wherein, $n_{GB}$ is refractive index of a grating bulge 31 corresponding to the non-sight concentration area B, $n_{SB}$ is refractive index of a filler in a gap 32 between two adjacent grating bulges 31 corresponding to the non-sight concentration area B, $\lambda$ is a wavelength of incident light incident at the grating layer 30, $m_B$ is a second constant, which satisfies: $m_B = \frac{1}{2}$, $j=0, 1, 2, 3, 4 \ldots$.

When the thickness $h_B$ of the grating bulge 31 corresponding to the non-sight concentration area B satisfies formula (2), the first-order diffraction obtained by diffraction of the incident light at an area of the grating layer 30 corresponding to the non-sight concentration area B has a constructive interference, which will increase the intensity of the first-order diffraction obtained by diffraction of the incident light at the area of the grating layer 30 corresponding to the non-sight concentration area B, thereby increasing the intensity of light emitted from the non-sight concentration area B of the display device 10 and falling into the sight of the viewer Z, such that the intensity of light emitted from the non-sight concentration area B of the display device 10 and falling into the sight of the viewer Z matches the intensity of light emitted from the sight concentration area A of the display device 10 and falling into the sight of the viewer Z, thereby reducing the difference between the brightness of a region of the image as viewed by the viewer Z corresponding to the sight concentration area A and the brightness of a region of the image as viewed by the viewer Z corresponding to the non-sight concentration area B, improving brightness uniformity of the image viewed by the viewer Z, improving viewing experience of the viewer Z and bringing more real and comfortable viewing experience to the viewer Z.

In the above embodiment, the display device 10 comprises a plurality of R pixels 24, a plurality of G pixels 25 and a plurality of B pixels 26, and the grating layer 30 comprises a R grating region 33 corresponding to the R pixels 24, a G grating region 34 corresponding to G pixels 25, and a B grating region 35 corresponding to B pixels 26. When setting the thicknesses of the grating bulges 31 in an area of the R grating region 33 corresponding to the non-sight concentration area B, the wavelength $\lambda$ of the light incident to the grating layer 30 is the wavelength of red light, which is 630 nm; when setting the thicknesses of the grating bulges 31 in an area of the G grating region 34 corresponding to the non-sight concentration area B, the wavelength $\lambda$ of the light incident to the grating layer 30 is the wavelength of green light, which is 550 nm; when setting the thicknesses of the grating bulges 31 in an area of the B grating region 35 corresponding to the non-sight concentration area B, the wavelength $\lambda$ of the light incident to the grating layer 30 is the wavelength of blue light, which is 430 nm.

A thickness $h_A$ of a grating bulge 31 corresponding to the sight concentration area A satisfies the formula of:

$$h_A = \frac{m_A \lambda}{|n_{GA} - n_{SA}|} \quad (3)$$

wherein, $n_{GA}$ is refractive index of a grating bulge 31 corresponding to the sight concentration area A, $n_{SA}$ is refractive index of a filler in a gap 32 between two adjacent grating bulges 31 corresponding to the sight concentration area A, $\lambda$ is a wavelength of incident light incident to the grating layer 30, $m_A$ is a first constant, which satisfies: $i-\frac{1}{2} < m_A < i+\frac{1}{2}$, $i=1, 2, 3, 4 \ldots$.

In formula (3), the first constant $m_A$ satisfies $i-\frac{1}{2} < m_A < i+\frac{1}{2}$, $i=1, 2, 3, 4 \ldots$, i.e., the first constant $m_A$ is not a half integer. Then, the zero-order diffraction obtained by diffraction of the incident light incident at an area of the grating layer 30 corresponding to the sight concentration area A will not have complete destructive interference, and the zero-order diffraction obtained by diffraction of the incident light incident at an area of the grating layer 30 corresponding to the sight concentration area A will not have complete constructive interference, either. That is, when the thickness $h_B$ of the grating bulge 31 corresponding to the sight concentration area A satisfies formula (2), the intensity of light of the zero-order diffraction obtained by diffraction of the incident light at an area of the grating layer 30 corresponding to the sight concentration area A can be adjusted, so that the intensity of light emitted from the non-sight concentration area B of the display device 10 and falling into the sight of the viewer Z matches the intensity of light emitted from the sight concentration area A of the display device 10 and falling into the sight of the viewer Z, thereby reducing the difference between the brightness of a region of the image as viewed by the viewer Z corresponding to the sight concentration area A and the brightness of a region of the image as viewed by the viewer Z corresponding to the non-sight concentration area B, improving brightness uniformity of the image viewed by the viewer Z, improving viewing experience of the viewer Z and bringing more real and comfortable viewing experience to the viewer Z.

In the above embodiment, the display device 10 comprises a plurality of R pixels 24, a plurality of G pixels 25 and a plurality of B pixels 26, and the grating layer 30 comprises a R grating region 33 corresponding to the R pixels 24, a G grating region 34 corresponding to G pixels 25, and a B grating region 35 corresponding to B pixels 26. When setting the thicknesses of the grating bulges 31 in an area of the R grating region 33 corresponding to the sight concentration area A, the wavelength λ of the light incident to the grating layer 30 is the wavelength of red light, which is 630 nm; when setting the thicknesses of the grating bulges 31 in an area of the G grating region 34 corresponding to the sight concentration area A, the wavelength λ of the light incident to the grating layer 30 is the wavelength of green light, which is 550 nm; when setting the thicknesses of the grating bulges 31 in an area of the B grating region 35 corresponding to the sight concentration area A, the wavelength λ of the light incident to the grating layer 30 is the wavelength of blue light, which is 430 nm.

In the above embodiment, the value of the first constant $m_A$ can be an integer or a non-integer, and in practical applications, the value of the first constant $m_A$ can be determined according to the actual need. For example, when a difference between the intensity of the zero-order diffraction obtained by diffraction of the incident light at an area of the grating layer 30 corresponding to the sight concentration area A and the intensity of the first-order diffraction obtained by diffraction of the incident light at an area of the grating layer 30 corresponding to the non-sight concentration area B is small, the first constant $m_A$ can be an integer, and the zero-order diffraction obtained by diffraction of the incident light at an area of the grating layer 30 corresponding to the sight concentration area A has constructive interference. At this time, the intensity of light of the zero-order diffraction obtained by diffraction of the incident light at the area of the grating layer 30 corresponding to the sight concentration area A reaches the maximum. Alternatively, the first constant $m_A$ can be a non-integer, and the value of the first constant $m_A$ is close to an integer. For example, when i=1, and $0.5<m_A<1$, the value of the first constant $m_A$ is 0.85, 0.9 or 0.95, etc.; when i=1, and $1<m_A<1.5$, the value of the first constant $m_A$ is 1.05, 1.1 or 1.15, etc.

When a difference between the intensity of the zero-order diffraction obtained by diffraction of the incident light at the area of the grating layer 30 corresponding to the sight concentration area A and the intensity of the first-order diffraction obtained by diffraction of the incident light at the area of the grating layer 30 corresponding to the non-sight concentration area B is large, the first constant $m_A$ may be not an integer, and the value of the first constant $m_A$ is optionally close to a half integer, namely, the value of the first constant $m_A$ satisfies: $i-½<m_A<i$, i=1, 2, 3, 4 . . . , or, $i<m_A<i+½$, i=1, 2, 3, 4 . . . . For example, when i=1 and $0.5<m_A<1$, the value of the first constant $m_A$ can be 0.55, 0.58 or 0.6, etc.; when i=1 and $1<m_A<1.5$, the value of the first constant $m_A$ can be 1.4, 1.43 or 1.46, etc.

By setting the value of the first constant $m_A$, the zero-order diffraction obtained by diffraction of the incident light at the area of the grating layer 30 corresponding to the sight concentration area A will not have complete constructive interference, so that the intensity of light emitted from the sight concentration area A of the display device 10 and falling into the sight of the viewer Z matches the intensity of light emitted from the non-sight concentration area B of the display device 10 and falling into the sight of the viewer Z.

In the above embodiment, there is a difference between the refractive index $n_{GA}$ of the grating bulge 31 corresponding to the sight concentration area A and the refractive index $n_{SA}$ of the filler in the gap between two adjacent grating bulges 31 corresponding to the sight concentration area A, and the values of $n_{GA}$ and $n_{SA}$ can be set according to the actual application. For example, the relationship between $n_{GA}$ and $n_{SA}$ can be $n_{GA}<n_{SA}$ or $n_{GA}>n_{SA}$. In the embodiment of the present disclosure, the relationship between $n_{GA}$ and $n_{SA}$ is $n_{GA}>n_{SA}$. For example, $n_{GA}=1.5$, $n_{SA}=1$. That is, the material forming the grating bulges 31 has a refractive index of 1.5, and the filler filled in the gap between two adjacent grating bulges 31 has a refractive index of 1. When the grating layer 30 is external to the display panel 20, the filler between two adjacent grating bulges 31 corresponding to the sight concentration area A can be air.

In the above embodiment, there is a difference between the refractive index $n_{GB}$ of the grating bulge 31 corresponding to the non-sight concentration area B and the refractive index $n_{SB}$ of the filler in the gap between two adjacent grating bulges 31 corresponding to the non-sight concentration area B, and the values of $n_{GB}$ and $n_{SB}$ can be set according to the actual application. For example, the relationship between $n_{GB}$ and $n_{SB}$ can be $n_{GB}<n_{SB}$ or $n_{GB}>n_{SB}$. In the embodiment of the present disclosure, the relationship between $n_{GB}$ and $n_{SB}$ is $n_{GB}>n_{SB}$. For example, $n_{GB}=1.5$, $n_{SB}=1$. That is, the material forming the grating bulges 31 has a refractive index of 1.5, and the filler filled in the gap between two adjacent grating bulges 31 has a refractive index of 1. When the grating layer 30 is external to the display panel 20, the filler between two adjacent grating bulges 31 corresponding to the non-sight concentration area B can be air.

In formula (2), when the values of $n_{GB}$, $n_{SB}$ and λ are determined, the larger the value of the second constant $m_B$, the larger the thickness $h_B$ of the grating bulge 31 corresponding to the non-sight concentration area B. When making a thick grating bulge 31, more processes and time are needed, so the display device 10 has a high manufacturing cost and cannot be designed thin. Thus in order to reduce the manufacturing cost of the display device 10 and to facilitate a thin design thereof, in an embodiment of the present disclosure, the second constant $m_B=0.5$ so as to reduce the thickness $h_B$ of the grating bulge 31 corresponding to the non-sight concentration area B, thereby reducing the manufacturing cost of the display device 10 and facilitating a thin design of the display device 10.

In formula (3), when the values of $n_{GA}$, $n_{SA}$ and λ are determined, the larger the value of the first constant $m_A$, the larger the thickness $h_A$ of the grating bulge 31 corresponding to the sight concentration area A. When making a thick grating bulge 31, more processes and time are needed, so the display device 10 has a high manufacturing cost and cannot be designed thin. Thus in order to reduce the manufacturing cost of the display device 10 and to facilitate a thin design thereof, in an embodiment of the present disclosure, the first constant $m_A$ satisfies $0.5<m_A<1.5$ and the first constant $m_A$ optionally satisfies $0.5<m_A\leq 1$ so as to reduce the thickness $h_A$ of the grating bulge 31 corresponding to the sight concentration area A, thereby reducing the manufacturing cost of the display device 10 and facilitating a thin design of the display device 10.

In the above embodiment, the display device 10 comprises a plurality of R pixels 24, a plurality of G pixels 25 and a plurality of B pixels 26, and the grating layer 30 comprises a R grating region 33 corresponding to the R pixels 24, a G grating region 34 corresponding to G pixels 25, and a B grating region 35 corresponding to B pixels 26.

When setting the thickness of the grating bulge 31 in an area of the R grating region 33 corresponding to the non-sight concentration area B, the wavelength λ of the light incident to the grating layer 30 is the wavelength of red light, which is 630 nm. According to formula (2), when the second constant $m_B$ is 0.5 and $|n_{GB}-n_{SB}|$ is 0.5, a thickness $h_{BR}$ of the grating bulge 31 in the area of the R grating region 33 corresponding to the non-sight concentration area B is 630 nm. When setting the thickness of the grating bulge 31 in an area of the G grating region 34 corresponding to the non-sight concentration area B, the wavelength λ of the light incident to the grating layer 30 is the wavelength of green light, which is 550 nm. According to formula (2), when the second constant $m_B$ is 0.5 and $|n_{GB}-n_{SB}|$ is 0.5, a thickness $h_{BG}$ of the grating bulge 31 in the area of the G grating region 34 corresponding to the non-sight concentration area B is 550 nm. When setting the thickness of the grating bulge 31 in an area of the B grating region 35 corresponding to the non-sight concentration area B, the wavelength λ of the light incident to the grating layer 30 is the wavelength of blue light, which is 430 nm. According to formula (2), when the second constant $m_B$ is 0.5 and $|n_{GB}-n_{SB}|$ is 0.5, a thickness $h_{BB}$ of the grating bulge 31 in the area of the B grating region 35 corresponding to the non-sight concentration area B is 430 nm.

When setting the thickness $h_{AR}$ of the grating bulge 31 in an area of the R grating region 33 corresponding to the sight concentration area A, the wavelength λ of the light incident to the grating layer 30 is the wavelength of red light, which is 630 nm. According to formula (3), when the first constant $m_A$ satisfies $0.5<m_A<1.5$ and $|n_{GA}-n_{SA}|$ is 0.5, a thickness $h_{AR}$ of the grating bulge 31 in the area of the R grating region 33 corresponding to the sight concentration area A satisfies 315 nm<$h_{AR}$<945 nm. In practical applications, when a difference between the intensity of the zero-order diffraction obtained by diffraction of the incident light at the area of the R grating region 33 corresponding to the sight concentration area A and the intensity of the first-order diffraction obtained by diffraction of the incident light at the area of the R grating region 33 corresponding to the non-sight concentration area B is small, the thickness $h_{AR}$ of the grating bulge 31 in the area of the R grating region 33 corresponding to the sight concentration area A can be 630 nm. Alternatively, the thickness $h_{AR}$ of the grating bulge 31 in the area of the R grating region 33 corresponding to the sight concentration area A can have a value close to 630 nm, for example, the thickness $h_{AR}$ of the grating bulge 31 in the area of the R grating region 33 corresponding to the sight concentration area A can be 550 nm, 580 nm, 600 nm, 650 nm or 680 nm, etc. When a difference between the intensity of the zero-order diffraction obtained by diffraction of the incident light at an area of the grating layer 30 corresponding to the sight concentration area A and the intensity of the first-order diffraction obtained by diffraction of the incident light at an area of the grating layer 30 corresponding to the non-sight concentration area B is large, optionally, the thickness $h_{AR}$ of the grating bulge 31 in the area of the R grating region 33 corresponding to the sight concentration area A is close to 315 nm, for example, the thickness $h_{AR}$ of the grating bulge 31 in the area of the R grating region 33 corresponding to the sight concentration area A can be 330 nm, 370 nm or 400 nm, etc. Alternatively, the thickness $h_{AR}$ of the grating bulge 31 in the area of the R grating region 33 corresponding to the sight concentration area A is close to 945 nm, for example, the thickness $h_{AR}$ of the grating bulge 31 in the area of the R grating region 33 corresponding to the sight concentration area A can be 850 nm, 900 nm or 930 nm, etc.

When setting the thickness of the grating bulge 31 in the area of the G grating region 34 corresponding to the sight concentration area A, the wavelength λ of the light incident to the grating layer 30 is the wavelength of green light, which is 550 nm. According to formula (3), when the first constant $m_A$ satisfies $0.5<m_A<1.5$ and $|n_{GA}-n_{SA}|$ is 0.5, a thickness $h_{AG}$ of the grating bulge 31 in an area of the G grating region 34 corresponding to the sight concentration area A satisfies 275 nm<$h_{AG}$<825 nm. In practical applications, when a difference between the intensity of the zero-order diffraction obtained by diffraction of the incident light at the area of the G grating region 34 corresponding to the sight concentration area A and the intensity of the first-order diffraction obtained by diffraction of the incident light at the area of the G grating region 34 corresponding to the non-sight concentration area B is small, the thickness $h_{AG}$ of the grating bulge 31 in the area of the G grating region 34 corresponding to the sight concentration area A can be 550 nm. Alternatively, the thickness $h_{AG}$ of the grating bulge 31 in the area of the G grating region 34 corresponding to the sight concentration area A may have a value close to 550 nm, for example, the thickness $h_{AG}$ of the grating bulge 31 in the area of the G grating region 34 corresponding to the sight concentration area A can be 500 nm, 530 nm, 580 nm, 600 nm, etc. When a difference between the intensity of the zero-order diffraction obtained by diffraction of the incident light at an area of the G grating region 34 corresponding to the sight concentration area A and the intensity of the first-order diffraction obtained by diffraction of the incident light at an area of the G grating region 34 corresponding to the non-sight concentration area B is large, optionally, the thickness $h_{AG}$ of the grating bulge 31 in the area of the G grating region 34 corresponding to the sight concentration area A is close to 275 nm, for example, the thickness $h_{AG}$ of the grating bulge 31 in the area of the G grating region 34 corresponding to the sight concentration area A can be 300 nm, 320 nm or 350 nm, etc. Alternatively, the thickness $h_{AG}$ of the grating bulge 31 in the area of the G grating region 34 corresponding to the sight concentration area A is close to 825 nm, for example, the thickness $h_{AG}$ of the grating bulge 31 in the area of the G grating region 34 corresponding to the sight concentration area A can be 800 nm, 760 nm or 730 nm, etc.

When setting the thickness $h_{AB}$ of a grating bulge 31 in an area of the B grating region 35 corresponding to the sight concentration area A, the wavelength λ of the light incident to the grating layer 30 is the wavelength of blue light, which is 430 nm. According to formula (3), when the first constant $m_A$ satisfies $0.5<m_A<1.5$ and $|n_{GA}-n_{SA}|$ is 0.5, a thickness $h_{AB}$ of the grating bulge 31 in the area of the B grating region 35 corresponding to the sight concentration area A satisfies 215 nm<$h_{AB}$<645 nm. In practical application, when a difference between the intensity of the zero-order diffraction obtained by diffraction of the incident light at an area of the B grating region 35 corresponding to the sight concentration area A and the intensity of the first-order diffraction obtained by diffraction of the incident light at an area of the B grating region 35 corresponding to the non-sight concentration area B is small, the thickness $h_{AB}$ of the grating bulge 31 in the area of the B grating region 35 corresponding to the sight concentration area A can be 430 nm. Alternatively, the thickness $h_{AB}$ of the grating bulge 31 in the area of the B grating region 35 corresponding to the sight concentration area A can have a value close to 430 nm, for example, the thickness $h_{AB}$ of the grating bulge 31 in the area of the B grating region 35 corresponding to the sight concentration area A can be 350 nm, 380 nm, 480 nm, or 500 nm, etc. When a difference between the intensity of the zero-order diffraction obtained by diffraction of the incident light at the area of the B grating region 35 corresponding to the sight concentration area A and the intensity of the first-order diffraction obtained by diffraction of the incident light at the area of the B grating region 35 corresponding to the non-sight concentration area B is large, optionally, the thickness h of the grating bulge 31 in the area of the B grating region 35 corresponding to the sight concentration area A is close to 215 nm, for example, the thickness $h_{AB}$ of the grating bulge 31 in the area of the B grating region 35 corresponding to the sight concentration area A can be 250 nm, 280 nm or 300 nm, etc. Alternatively, the thickness $h_{AB}$ of the grating bulge 31 in the area of the B grating region 35 corresponding to the sight concentration area A is close to 645 nm, for example, the thickness $h_{AB}$ of the grating bulge 31 in the area of the B grating region 35 corresponding to the sight concentration area A can be 620 nm, 600 nm or 550 nm, etc.

In the above embodiment, by setting the grating period in respective areas of the grating layer 30, the grating period of the grating layer 30 decreases gradually from the center a of the sight concentration area A to edges of the display device 10, so that light emitted from the non-sight concentration area B of the display device 10 can deflect towards the sight of the viewer Z, thereby adjusting the light emergent direction of the non-sight concentration area B of the display device 10 and increasing the light ray amount and intensity of light emitted from the non-sight concentration area B of the display device 10 and falling into the sight of the viewer Z; by setting the thicknesses of the grating bulges in respective areas of the grating layer 30, the non-zero-order diffraction (e.g. the first-order diffraction) obtained by diffraction of the incident light at the area of the grating layer 30 corresponding to the non-sight concentration area B is made to have a constructive interference, which will increase the intensity of the non-zero-order diffraction obtained by diffraction of the incident light at the area of the grating layer 30 corresponding to the non-sight concentration area B, thereby increasing the intensity of light emitted from the non-sight concentration area B of the display device 10 and falling into the sight of the viewer Z. Thus by setting the grating period and the thicknesses of the grating bulges in respective areas of the grating layer 30, respectively, the light ray amount of light emitted from the non-sight concentration area B of the display device 10 and falling into the sight of the viewer Z can be made to match the light ray amount of light emitted from the sight concentration area A of the display device 10 and falling into the sight of the viewer Z, and the intensity of light emitted from the non-sight concentration area B of the display device 10 and falling into the sight of the viewer Z can be made to match the intensity of light emitted from the sight concentration area A of the display device 10 and falling into the sight of the viewer Z.

Figure 18:
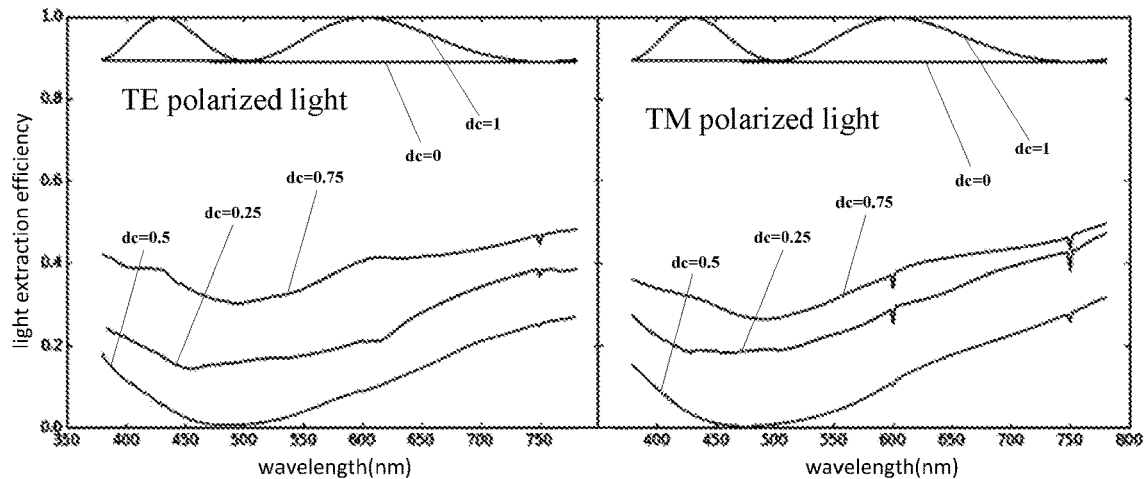
FIG. 18 is a diagram of relationship between light extraction efficiency of zero-order diffraction and a grating duty cycle.
Figure 19:
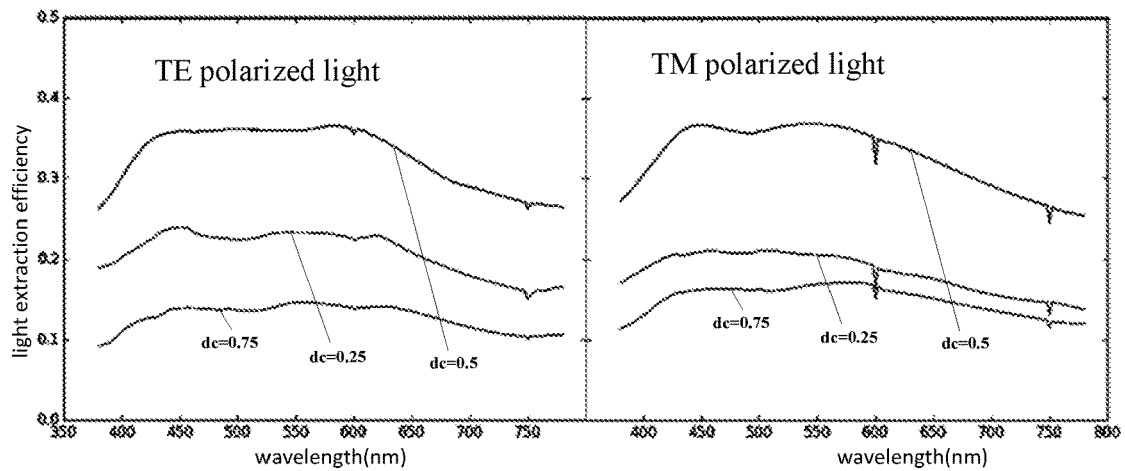
FIG. 19 is a diagram of relationship between light extraction efficiency of first-order diffraction and a grating duty cycle.

In practical applications, referring to FIGS. 18 and 19, when the grating period of the grating layer 30 is 3 μm and the thickness of a grating bulge 31 of the grating layer 30 is 500 nm, a relationship between the light extraction efficiency of the zero-order diffraction obtained by the incident light incident on the grating layer 30 being diffracted at the grating layer 30 and the grating duty cycle is as shown in FIG. 18, and a relationship between the light extraction efficiency of the first-order diffraction obtained by the incident light incident on the grating layer 30 being diffracted at the grating layer 30 and the grating duty cycle is as shown in FIG. 19. It can be seen from FIG. 18 that as for the zero-order diffraction, when the grating duty cycle is 0.5, the zero-order diffraction has the smallest intensity, and when the grating duty cycle is smaller than 0.5, the intensity of the zero-order diffraction decreases as the grating duty cycle increases, and when the grating duty cycle is greater than 0.5, the intensity of the zero-order diffraction increases as the grating duty cycle increases. It can be seen from FIG. 19 that as for the first-order diffraction, when the grating duty cycle is 0.5, the first-order diffraction has the largest intensity, and when the grating duty cycle is smaller than 0.5, the intensity of the first-order diffraction increases as the grating duty cycle increases, and when the grating duty cycle is greater than 0.5, the intensity of the first-order diffraction decreases as the grating duty cycle increases.

In other words, the intensities of light emitted from respective areas of the display device 10 are also related to the grating duty cycle of the grating layer 30, and according to this conclusion, by setting the grating duty cycles of the areas of the grating layer 30 corresponding to the sight concentration area A and the non-sight concentration area B, the intensity of the non-zero-order diffraction obtained by diffraction of the incident light at the area of the grating layer 30 corresponding to the non-sight concentration area B can be increased, and accordingly, the intensity of the light emitted from the non-sight concentration area B of the display device 10 and falling into the sight of the viewer Z can be increased, and when necessary, the intensity of the zero-order diffraction obtained by diffraction of the incident light at the area of the grating layer 30 corresponding to the sight concentration area A can be decreased properly, and accordingly, the intensity of the light emitted from the sight concentration area A of the display device 10 and falling into the sight of the viewer Z can be decreased properly, as a result, the intensity of light emitted from the non-sight concentration area B of the display device 10 and falling into the sight of the viewer Z is made to match the intensity of light emitted from the sight concentration area A of the display device 10 and falling into the sight of the viewer Z.

Specifically, in the area corresponding to the sight concentration region A, the grating duty cycle $dc_A$ of the grating layer 30 satisfies $0.2 \le dc_A \le 0.8$; in the area corresponding to the non-sight concentration region B, the grating duty cycle $dc_B$ of the grating layer 30 is 0.5. During implementation, in the area corresponding to the sight concentration region A, the grating duty cycle of the R grating region 33, the grating duty cycle of the G grating region 34, and the grating duty cycle of the B grating region 35 are all between 0.2 and 0.8, and in the area corresponding to the non-sight concentration region B, the grating duty cycle of the R grating region 33, the grating duty cycle of the G grating region 34, and the grating duty cycle of the B grating region 35 are all 0.5.

In an embodiment of the present disclosure, in the area corresponding to the non-sight concentration region B, the grating duty cycle $dc_B$ of the grating layer 30 is set as 0.5, so in the area corresponding to the non-sight concentration region B, when the grating period of the grating layer 30 and the thickness of a grating bulge 31 of the grating layer 30 are fixed, the first-order diffraction obtained by diffraction of the incident light at the area of the grating layer 30 corresponding to the non-sight concentration area B has the largest intensity, so that light emitted from the non-sight concentration area B of the display device 10 and falling into the sight of the viewer Z has a stronger intensity, as a result, the intensity of light emitted from the non-sight concentration area B of the display device 10 and falling into the sight of the viewer Z matches the intensity of light emitted from the sight concentration area A of the display device 10 and falling into the sight of the viewer Z.

In an embodiment of the present disclosure, in the area corresponding to the sight concentration region A, the grating duty cycle $dc_A$ of the grating layer 30 satisfies $0.2 \leq dc_A \leq 0.8$. During practical application, in the area corresponding to the sight concentration region A, the value of the grating duty cycle $dc_A$ of the grating layer 30 can be set according to actual needs. For example, when a difference between the intensity of light emitted from the non-sight concentration area B of the display device 10 and falling into the sight of the viewer Z and the intensity of light emitted from the sight concentration area A of the display device 10 and falling into the sight of the viewer Z is large, the value of the grating duty cycle $dc_A$ of the area of the grating layer 30 corresponding to the sight concentration area A can be 0.5. In this case, when the grating period of the area of the grating layer 30 corresponding to the sight concentration area A and the thickness of a grating bulge 31 of the grating layer 30 are fixed, the zero-order diffraction obtained by diffraction of the incident light at the area of the grating layer 30 corresponding to the sight concentration area A has the smallest intensity, so that the intensity of the zero-order diffraction obtained by diffraction of the incident light at the area of the grating layer 30 corresponding to the sight concentration area A can be decreased properly, as a result, the intensity of light emitted from the non-sight concentration area B of the display device 10 and falling into the sight of the viewer Z matches the intensity of light emitted from the sight concentration area A of the display device 10 and falling into the sight of the viewer Z. When there is a small difference between the intensity of light emitted from the non-sight concentration area B of the display device 10 and falling into the sight of the viewer Z and the intensity of light emitted from the sight concentration area A of the display device 10 and falling into the sight of the viewer Z, the grating duty cycle $dc_A$ of the area of the grating layer 30 corresponding to the sight concentration area A can be made to satisfy $0.2 \leq dc_A < 0.5$, or $0.5 < dc_A \leq 0.8$. For example, the value of the grating duty cycle $dc_A$ of the grating layer 30 can be 0.2, 0.3, 0.4, 0.6, 0.7 or 0.8. In this case, when the grating period of the area of the grating layer 30 corresponding to the sight concentration area A and the thickness of the grating bulge 31 of the grating layer 30 are fixed, the intensity of the zero-order diffraction obtained by diffraction of the incident light at the area of the grating layer 30 corresponding to the sight concentration area A is not the smallest, and the intensity of the zero-order diffraction obtained by diffraction of the incident light at the area of the grating layer 30 corresponding to the sight concentration area A is not the largest, either, so that the intensity of light emitted from the non-sight concentration area B of the display 10 and falling into the sight of the viewer Z matches the intensity of light emitted from the sight concentration area A of the display device 10 and falling into the sight of the viewer Z.

Figure 9:
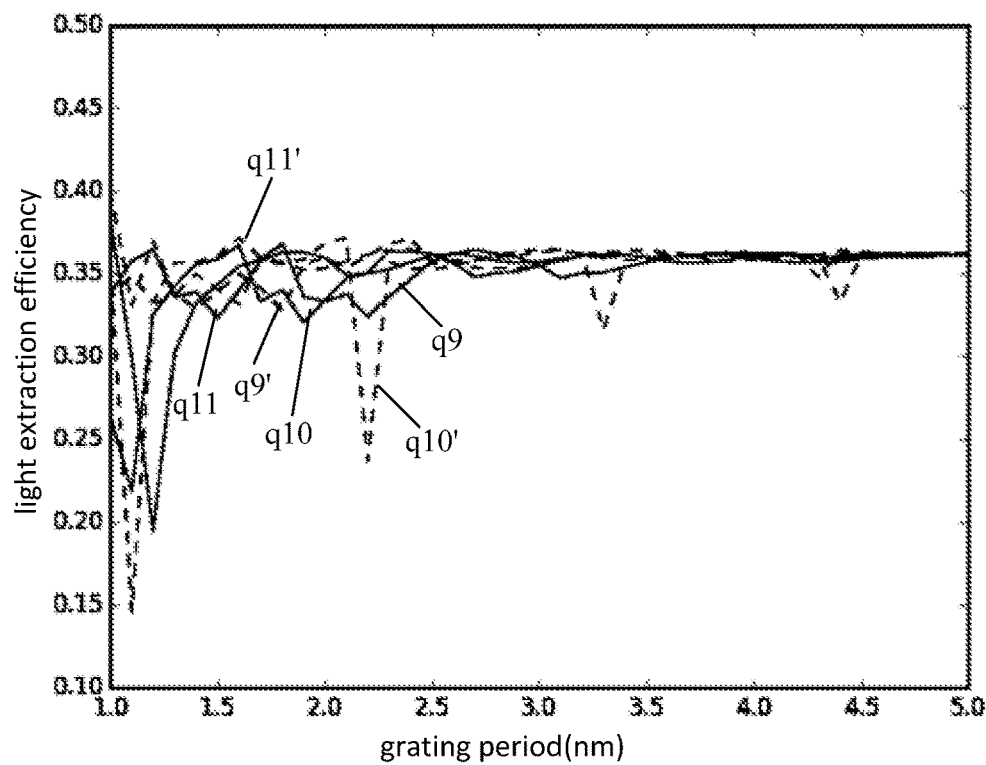
FIG. 9 is a diagram of relationship between light extraction efficiency of first-order diffraction and grating period in a non-sight concentration area.
Figure 10:
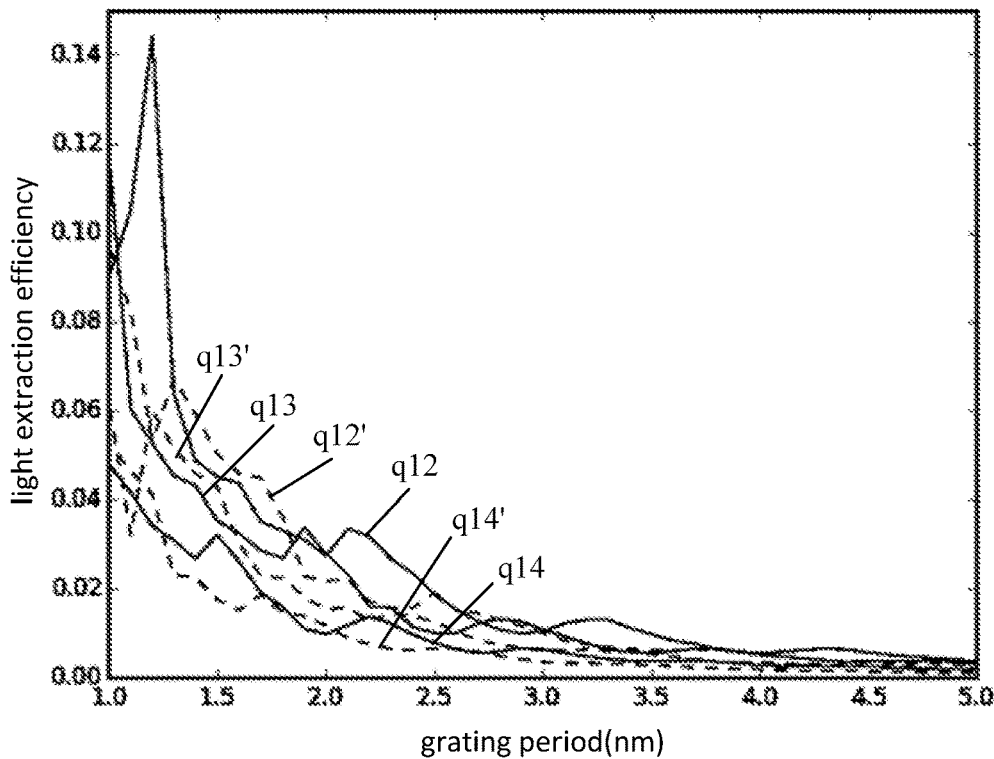
FIG. 10 is a diagram of relationship between light extraction efficiency of zero-order diffraction and grating period in a non-sight concentration area.

In the above embodiment, the display device may be a liquid crystal display device, and the grating layer 30 in the display device 10 is set in the way shown in FIGS. 6 and 7, and in the area corresponding to the non-sight concentration area B, the thickness $h_{BR}$ of a grating bulge 31 of the R grating region 33 is 630 nm, the thickness $h_{BG}$ of a grating bulge 31 of the G grating region 34 is 550 nm, and the thickness $h_{BB}$ of a grating bulge 31 of the B grating region 35 is 430 nm. In the area corresponding to the non-sight concentration area B, the grating duty cycle $dc_B$ of the grating layer 30 is 0.5. When the grating layer 30 is at a light emergent side of a color film layer of the display panel 20, and the grating layer 30 contacts the color film layer, through calculation, it is obtained that in the area corresponding to the non-sight concentration area B, a relationship between the light extraction efficiency of the first-order diffraction obtained by diffraction of the incident light at the grating layer 30 and the grating period is as shown in FIG. 9. It can be seen from FIG. 9 that in the non-sight concentration area B, the light extraction efficiency of the first-order diffraction corresponding to the R grating region 33 (as shown by graph q9 and graph q9'), the light extraction efficiency of the first-order diffraction corresponding to the G grating region 34 (as shown by graph q10 and graph q10'), the light extraction efficiency of the first-order diffraction corresponding to the B grating region 35 (as shown by graph q11 and graph q11') are basically unchanged, so the intensity of the first-order diffraction corresponding to the R grating region 33, the intensity of the first-order diffraction corresponding to the G grating region 34 and the intensity of the first-order diffraction corresponding to the B grating region 35 are not suppressed. In the area corresponding to the non-sight concentration area B, a relationship between the light extraction efficiency of the zero-order diffraction obtained by diffraction of the incident light at the grating layer 30 and the grating period is as shown in FIG. 10. It can be seen from FIG. 10 that in the non-sight concentration area B, the light extraction efficiency of the zero-order diffraction corresponding to the R grating region 33 (as shown by graph q12 and graph q12'), the light extraction efficiency of the zero-order diffraction corresponding to the G grating region 34 (as shown by graph q13 and graph q13'), the light extraction efficiency of the zero-order diffraction corresponding to the B grating region 35 (as shown by graph q14 and graph q14') are distinctly suppressed.

Referring to FIGS. 9 and 10, in the area corresponding to the non-sight concentration area B, the intensity of the zero-order diffraction corresponding to the R grating region 33, the intensity of the zero-order diffraction corresponding to the G grating region 34 and the intensity of the zero-order diffraction corresponding to the B grating region 35 are respectively suppressed to some extent, while the intensity of the first-order diffraction corresponding to the R grating region 33, the intensity of the first-order diffraction corresponding to the G grating region 34 and the intensity of the first-order diffraction corresponding to the B grating region 35 are respectively increased.

In FIG. 9, each of graph q9, graph q10 and graph q11 has fluctuations which are caused by Bragg resonance of monochromatic light on the grating layer 30. When the monochromatic light becomes a light spectrum having a certain width, these fluctuations can be reduced or eliminated. In practical application, these fluctuations can be reduced or eliminated by other ways. For example, the section shape of a grating bulge 31 of the grating layer 30 can be designed as a step shape, a triangular shape or a trapezoidal shape, thereby reducing or eliminating these fluctuations.

In the above embodiment, the grating bulges 31 can be either transparent grating bulges or non-transparent grating bulges, and there are many options for the material of the grating bulges 31. In an embodiment of the present disclosure, the grating bulges 31 are transparent grating bulges and are polymethyl methacrylate grating bulges.

Referring to FIGS. 20-25, a section shape of a grating bulge 31 can be a step shape, a trapezoidal shape, or a triangular shape.

Figure 20:
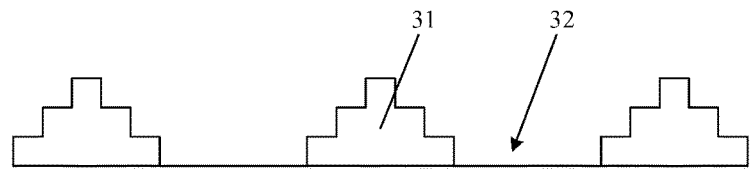
FIG. 20 is a sectional view of grating bulges.
Figure 21:
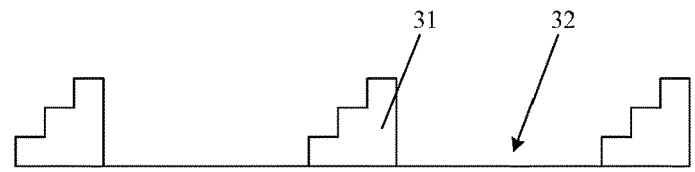
FIG. 21 is another sectional view of grating bulges.

For example, referring to FIGS. 20-21, the grating layer 30 comprises a plurality of grating bulges 31, and there is a gap 32 between two adjacent grating bulges 31. When a grating bulge 31 is cut by a plane perpendicular to a direction of extension of the gap 32 between two adjacent grating bulges 31, the obtained section shape of the grating bulge 31 is a step shape. In practical application, as shown in FIG. 21, one side of the section of the grating bulge 31 can have a step shape, or as shown in FIG. 20, both sides of the section of the grating bulge 31 have step shapes, and when both sides of the section of the grating bulge 31 have step shapes, the step shapes of both sides of the section of the grating bulge 31 can be symmetrical relative to a central line perpendicular to a light entrance surface of the grating bulge 31 in the section of the grating bulge 31, or the step shapes of both sides of the section of the grating bulge 31 can be asymmetrical relative to the central line perpendicular to the light entrance surface of the grating bulge 31 in the section of the grating bulge 31.

Figure 22:
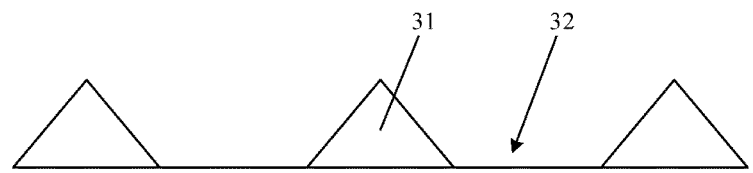
FIG. 22 is still another sectional view of grating bulges.
Figure 23:
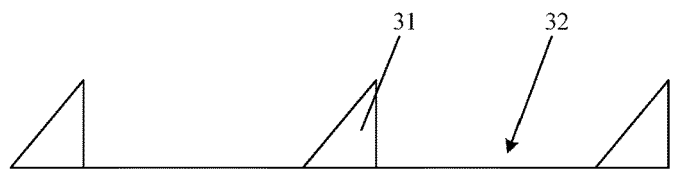
FIG. 23 is a sectional view of grating bulges.

Referring to FIGS. 22 and 23, the grating layer 30 comprises a plurality of grating bulges 31, and there is a gap 32 between two adjacent grating bulges 31. When a grating bulge 31 is cut by a plane perpendicular to a direction of extension of the gap 32 between two adjacent grating bulges 31, the obtained section shape of the grating bulge 31 is a triangular shape. In practical application, as shown in FIG. 22, both sides of the section of the grating bulge 31 can be symmetrical relative to a central line perpendicular to a light entrance surface of the grating bulge 31 in the section of the grating bulge 31, then the section shape of the grating bulge 31 is an isosceles triangle. Or as shown in FIG. 23, both sides of the section of the grating bulge 31 can be asymmetrical relative to the central line perpendicular to the light entrance surface of the grating bulge 31 in the section of the grating bulge 31.

Figure 24:
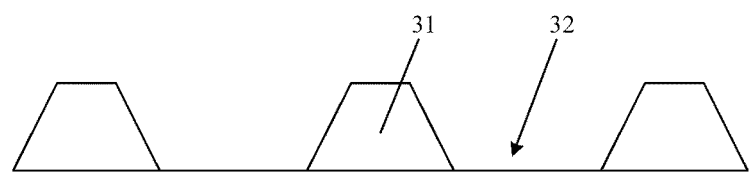
FIG. 24 is another sectional view of grating bulges.
Figure 25:
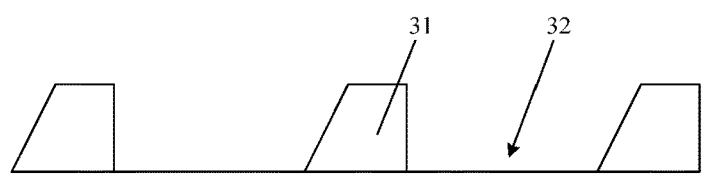
FIG. 25 is still another sectional view of grating bulges.

Referring to FIGS. 24 and 25, the grating layer 30 comprises a plurality of grating bulges 31, and there is a gap 32 between two adjacent grating bulges 31. When a grating bulge 31 is cut by a plane perpendicular to a direction of extension of the gap 32 between two adjacent grating bulges 31, the obtained section shape of the grating bulge 31 is a trapezoidal shape. In practical application, as shown in FIG. 24, both sides of the section of the grating bulge 31 can be symmetrical relative to a central line perpendicular to a light entrance surface of the grating bulge 31 in the section of the grating bulge 31, then the section shape of the grating bulge 31 is an isosceles trapezoid. Or as shown in FIG. 25, both sides of the section of the grating bulge 31 can be asymmetrical relative to the central line perpendicular to the light entrance surface of the grating bulge 31 in the section of the grating bulge 31.

Since the section shape of the grating bulge 31 is a step shape, a trapezoidal shape, or a triangular shape, a light emergent surface of each grating bulge is not parallel to a light entrance surface thereof. When light incident on the grating layer 30 passes through the grating layer 30, it is diffracted and interfered several times by the grating layer 30, thus the effects of diffraction and interference of the incident light on the grating layer 30 are enhanced, and the ability of adjusting the light emission direction of respective areas of the display device 10 is enhanced, so that intensities of light emitted from respective areas of the display device 10 and falling into the sight of the viewer Z match, and light ray amounts of light emitted from respective areas of the display device 10 and falling into the sight of the viewer Z match. For example, fluctuations on each of the graphs as shown in FIGS. 9 and 10 can be eliminated or reduced to some extent to reduce a brightness difference between a bright area and a dark area of an image viewed by the viewer Z, thereby improving brightness uniformity of the image viewed by the viewer Z, improving viewing experience of the viewer Z and bringing more real and comfortable viewing experience to the viewer Z. Meanwhile, light propagation within the display device 10 can be better controlled, so that the effect of control to the light propagation within the display device 10 can be improved It shall be noted that when both sides of the section of the grating bulge 31 are asymmetrical relative to the central line of the section of the grating bulge 31, and when light incident on the grating layer 30 passes through the grating layer 30, the incident light is diffracted and interfered at the grating layer 30, and the diffraction angle and intensity of the obtained k-order diffraction are asymmetrical relative to the zero-order diffraction. By making both sides of the section of the grating bulge 31 to be asymmetrical relative to the central line of the section of the grating bulge 31, the k-order diffraction emitted back to the sight of the viewer Z is enabled to have destructive interference, while the k-order diffraction emitted towards the sight of the viewer Z is enabled to have constructive interference, thereby increasing intensity of the k-order diffraction emitted towards the sight of the viewer Z and enhancing the ability of adjusting the light emission directions of respective areas of the display device 10, as a result, intensities of light emitted from respective areas of the display device 10 and falling to the sight of the viewer Z match, the brightness difference between the bright area and the dark area of the image viewed by the viewer Z is reduced, thereby improving brightness uniformity of the image viewed by the viewer Z, improving viewing experience of the viewer Z and bringing more real and comfortable viewing experience to the viewer Z. Meanwhile, light propagation within the display device 10 can be better controlled, so that the effect of control to the light propagation within the display device 10 can be improved Referring to FIG. 3, the display panel 20 comprises a color film layer 23, and the grating layer 30 is at a light emergent side or a light entrance side of the color film layer 23. For example, as shown in FIG. 3, the display panel 20 comprises a first substrate 21, a second substrate 22 and a color film layer 23, the first substrate 21 and the second substrate 22 being opposite to each other and the color film layer 23 being disposed between the first substrate 21 and the second substrate 22. In FIG. 3, the downward direction is a light emergent direction of the display panel 20, and the upper side of the color film layer 23 in FIG. 3 is a light entrance side of the color film layer 23, and the lower side of the color film layer 23 in FIG. 3 is a light emergent side of the color film layer 23. The grating layer 30 can be at the light emergent side of the color film layer 23, for example, the grating layer 30 can be disposed between the color film layer 23 and the second substrate 22, or the grating layer 30 can be disposed on a side of the second substrate 22 facing away from the color film layer 23. Alternatively, the grating layer 30 can be at the light entrance side of the color film layer 23, for example, the grating layer 30 can be disposed between the color film layer 23 and the first substrate 21, or the grating layer 30 can be disposed on a side of the first substrate 21 facing away from the color film layer 23.

Still referring to FIG. 3, in an embodiment of the present disclosure, the grating layer 30 is at the light emergent side of the color film layer 23 and contacts the color film layer 23. Specifically, as shown in FIG. 3, the display panel 20 comprises a first substrate 21, a second substrate 22 and a color film layer 23, the first substrate 21 and the second substrate 22 being opposite to each other and the color film layer 23 being disposed between the first substrate 21 and the second substrate 22. The grating layer 30 is disposed between the color film layer 23 and the second substrate 22, and the grating layer 30 contacts the color film layer 23. In such a design, light incident on the grating layer 30 is light exiting from the color film layer 23, and since the grating layer 30 contacts the color film layer 23, emergent light from the color film layer 23 will not have a light mixing before being incident on the grating layer 30, resulting in reduction of the effect of control of the light propagation in the display device 10 by the grating layer 30 due to light mixing of the emergent light from the color film layer 23.

In the above embodiment, the grating layer 30 can be arranged external to the display panel 20. For example, the display device 10 is a liquid crystal display device, and the display device 10 comprises a back light source and a display panel 20 at a light emergent side of the back light source, and the back light source provides an area light source for the display panel 20. The grating layer 30 can be arranged at the light emergent side of the back light source, and be in contact with the back light source. The area light source provided by the back light source provides light incident to the display panel 20 after passing through the grating layer 30.

Still referring to FIG. 3, the display device 10 provided in the embodiment of the present disclosure further comprises a light scattering film 40 which is arranged at a light emergent side of the display panel 20 and is arranged at a light emergent side of the grating layer 30. For example, the display device 10 comprises a display panel 20, a grating layer 30 and a light scattering film 40, the display panel 20 comprises a first substrate 21, a second substrate 22 and a color film layer 23, the first substrate 21 and the second substrate 22 being opposite to each other and the color film layer 23 being disposed between the first substrate 21 and the second substrate 22. The light emergent side of the display panel 20 is a side of the second substrate 22 facing away from the first substrate 21. The grating layer 30 is disposed between the color film layer 23 and the second substrate 22, and the grating layer 30 contacts the color film layer 23. The light scattering film 40 is disposed on a side of the second substrate 22 facing away from the first substrate 21. By providing a light scatting film 40, light propagation within the display device 10 can be better adjusted, thus improving visual effects of images displayed by the display device 10.

The display device 10 provided in the above embodiment can be a non-virtual display device, for example the display device 10 is a common flat surface display device or curved surface display device. In this case, a haze of the light scattering film 40 is equal to or greater than 10%. The display device 10 provided in the above embodiment can also be a virtual display device, for example, the display device 10 is a 3D display device, a near eye display device or AR/VR display device. In this case, the haze of the light scattering film 40 is equal to or smaller than 10%.

When making the display device 10 provided in the above embodiments, the grating layer 30 can be prepared by various methods, for example, the grating layer 30 can be prepared by nanoimprint lithography or laser interference process.

It shall be noted that although the concept of the present disclosure is described by taking the display device 10 with the color scheme of RGB (Red, Green, Blue) as an example, those skilled in the art shall appreciate that the concept of the present disclosure can be applied to display devices with other color schemes, e.g. a color scheme of RGBW (Red, Green, Blue, White).

In descriptions of the above embodiments, specific features, structures, materials or characteristics can be combined in appropriate manners in any one or more embodiments or examples.

The above described are merely specific embodiments of the present disclosure, while they do not intend to limit the protection scope of the present disclosure. Any variation or substitution that is easily conceivable by those skilled in the art within the technical scope disclosed by the present disclosure shall fall into the protection scope of the present disclosure. Thus the protection scope of the present disclosure is defined by the appended claims.

The invention claimed is:

1. A display device, comprising: a display panel, and a grating layer arranged inside or outside of the display panel,
   wherein the display panel comprises a plurality of pixels of a first color, a plurality of pixels of a second color and a plurality of pixels of a third color arranged in an array, and the grating layer comprises a grating region of the first color corresponding to the pixels of the first color, a grating region of the second color corresponding to the pixels of the second color, and a grating region of the third color corresponding to pixels of the third color,
   wherein along a longitudinal direction of the display device, from a center of the display device to both sides of the display device, a grating period of the grating region of the first color, a grating period of the grating region of the second color, and a grating period of the grating region of the third color respectively decrease gradually, and
   wherein along a lateral direction of the display device, from the center of the display device to both sides of the display device, the grating period of the grating region of the first color, the grating period of the grating region of the second color, and the grating period of the grating region of the third color respectively decrease gradually.

2. The display device according to claim 1, wherein along the lateral direction of the display device, the display device comprises a plurality of columns of pixels of the first color, a plurality of columns of pixels of the second color, and a plurality of columns of pixels of the third color, the columns of pixels of the first color, the columns of pixels of the second color, and the columns of pixels of the third color are arranged alternately, each column of pixels of the first color comprises a plurality of pixels of the first color arranged along a longitudinal direction of the display device, each column of pixels of the second color comprises a plurality of pixels of the second color arranged along the longitudinal direction of the display device, and each column of pixels of the third color comprises a plurality of pixels of the third color arranged along the longitudinal direction of the display device;

the grating layer comprises a plurality of grating bulges, which are bar-shaped grating bulges, the grating bulges extend along the longitudinal direction of the display device and the grating bulges are arranged in parallel along the lateral direction of the display device.

3. The display device according to claim 1, wherein along the longitudinal direction of the display device, the display device comprises a plurality of rows of pixels of the first color, a plurality of rows of pixels of the second color, and a plurality of rows of pixels of the third color, the rows of pixels of the first color, the rows of pixels of the second color, and the rows of pixels of the third color are arranged alternately, each row of pixels of the first color comprises a plurality of pixels of the first color arranged along a lateral direction of the display device, each row of pixels of the second color comprises a plurality of pixels of the second color arranged along the lateral direction of the display device, and each rows of pixels of the third color comprises a plurality of pixels of the third color arranged along the lateral direction of the display device;

the grating layer comprises a plurality of grating bulges, which are bar-shaped grating bulges, the grating bulges extend along the lateral direction of the display device and the grating bulges are arranged in parallel along the longitudinal direction of the display device.

4. The display device according to claim 1, wherein the grating layer comprises a plurality of grating bulges, and a thickness $h_A$ of a grating bulge corresponding to a central area of the display panel satisfies:

$$h_A = \frac{m_A \lambda}{|n_{GA} - n_{SA}|}$$

wherein, $n_{GA}$ is a refractive index of the grating bulge corresponding to the central area, $n_{SA}$ is a refractive index of a filler in a gap between two adjacent grating bulges corresponding to the area central area, $\lambda$ is a wavelength of incident light incident to the grating layer, $m_A$ is a first constant, which satisfies: $i-\frac{1}{2}<m_A<i+\frac{1}{2}$, $i=1, 2, 3, 4 \ldots$;

a thickness $h_B$ of a grating bulge corresponding to a non-central area satisfies:

$$h_B = \frac{m_B \lambda}{|n_{GB} - n_{SB}|}$$

wherein, $n_{GB}$ is a refractive index of the grating bulge corresponding to the non-central area, $n_{SB}$ is a refractive index of a filler in a gap between two adjacent grating bulges corresponding to the non-central area, $\lambda$ is the wavelength of incident light incident to the grating layer, $m_B$ is a second constant, which satisfies: $m_B=j+\frac{1}{2}$, $j=0, 1, 2, 3, 4 \ldots$, wherein the central area of the display panel is display area of the display panel comprising a center of the display panel, the non-central area surrounds the central area of the display panel.

5. The display device according to claim 4, wherein $n_{GA}>n_{SA}$, $n_{GB}>n_{SB}$.

6. The display device according to claim 5, wherein $n_{GA}=n_{GB}=1.5$, $n_{SA}=n_{SB}=1$.

7. The display device according to claim 4, wherein $0.5<m_A<1.5$, $m_B=0.5$.

8. The display device according to claim 4, wherein the display device comprises a plurality of R pixels, a plurality of G pixels and a plurality of B pixels arranged in an array, the grating layer comprises a R grating region corresponding to R pixels, a G grating region corresponding to G pixels and B grating region corresponding to B pixels;

in an area corresponding to the non-central area, a thickness $h_{BR}$ of a grating bulge in the R grating region is 630 nm, a thickness $h_{BG}$ of a grating bulge in the G grating region is 550 nm, and a thickness $h_{BB}$ of a grating bulge in the B grating region is 430 nm;

in an area corresponding to the central area, a thickness $h_{AR}$ of a grating bulge in the R grating region satisfies 315 nm$<h_{AR}<$945 nm, a thickness $h_{AG}$ of a grating bulge in the G grating region satisfies 275 nm$<h_{AG}<$825 nm, and a thickness $h_{AB}$ of a grating bulge in the B grating region is satisfies 215 nm$<h_{AB}<$645 nm.

9. The display device according to claim 1, wherein in an area corresponding to the central area, a grating duty cycle $dc_A$ of the grating layer satisfies $0.2 \leq dc_A \leq 0.8$;

in an area corresponding to the non-central area, the grating duty cycle $dc_B$ of the grating layer is 0.5.

10. The display device according to claim 1, wherein incident light incident on the grating layer has an incident angle of 0°.

11. The display device according to claim 1, wherein the grating bulges of the grating layer are transparent grating bulges.

12. The display device according to claim 11, wherein the grating bulges of the grating layer are polymethyl methacrylate grating bulges.

13. The display device according to claim 1, wherein section shapes of the grating bulges of the grating layer are selected from a group comprising step shapes, trapezoidal shapes and triangular shapes.

14. The display device according to claim 1, wherein the display panel comprises a color film layer, the grating layer is at a light emergent side of the color film layer, and the grating layer contacts the color film layer.

15. The display device according to claim 1, wherein the display device further comprises a back light source which is arranged at a light entrance side of the display panel; the grating layer is arranged at a light emergent side of the back light source, and the grating layer contacts the back light source.

16. The display device according to claim 1, further comprising a light scattering film which is arranged at a light emergent side of the display panel and is arranged at a light emergent side of the grating layer.

17. The display device according to claim 16, wherein when the display device is a non-virtual display device, a haze of the light scattering film is equal to or greater than 10%;

when the display device is a virtual display device, a haze of the light scattering film is equal to or smaller than 10%.

* * * * *